United States Patent
Eitan et al.

(10) Patent No.: US 8,674,536 B2
(45) Date of Patent: Mar. 18, 2014

(54) WIND TURBINE WITH VARIABLE SPEED AUXILIARY GENERATOR AND LOAD SHARING ALGORITHM

(75) Inventors: Nimrod Eitan, Tel Aviv (IL); Jackob Pozmantir, Rishon Lezion (IL); Gideon Ziegelman, Tel Mond (IL)

(73) Assignee: Iqwind Ltd., Bazra (IL)

( * ) Notice: Subject to any disclaimer, the term of this patent is extended or adjusted under 35 U.S.C. 154(b) by 271 days.

(21) Appl. No.: 13/307,014

(22) Filed: Nov. 30, 2011

(65) Prior Publication Data
US 2013/0134709 A1     May 30, 2013

(51) Int. Cl.
*H02P 9/06*      (2006.01)

(52) U.S. Cl.
USPC ............................. 290/44; 290/55; 29/592.1

(58) Field of Classification Search
USPC ............... 290/44, 55, 52; 29/592.1, 596, 598
See application file for complete search history.

(56) References Cited

U.S. PATENT DOCUMENTS

| | | | |
|---|---|---|---|
| 2010/0230966 A1* | 9/2010 | Pavlak | 290/44 |
| 2011/0012365 A1* | 1/2011 | Becker | 290/55 |
| 2011/0206517 A1* | 8/2011 | Antonov et al. | 416/170 R |
| 2011/0285132 A1* | 11/2011 | Waszak et al. | 290/52 |
| 2012/0014797 A1* | 1/2012 | Hehenberger | 416/170 R |
| 2012/0114481 A1* | 5/2012 | Benitez Sanchez et al. | 416/1 |
| 2013/0043686 A1* | 2/2013 | Eitan et al. | 290/55 |

* cited by examiner

*Primary Examiner* — Michael Zarroli
(74) *Attorney, Agent, or Firm* — Mark M. Friedman

(57) ABSTRACT

An assembly for retrofitting fixed speed, doubly fed and fully converted wind turbines. A differential having an output shaft coupled to the main generator and a control shaft to change a ratio between differential input and output and coupled to the auxiliary generator. The main generator operates at constant frequency and is coupled to an electric power grid without a power converter. A variable speed auxiliary generator may be coupled to the electric grid through auxiliary power electronics. A controller may during low loads assign a full load to the auxiliary generator, during typical loads assign a variable shared load between the auxiliary and main generators based on an optimization algorithm and during high loads assign a fixed shared load between the auxiliary and main generators based on the internal gear ratio of the differential. For step-down differentials, at high loads the full load may go to the main generator.

20 Claims, 19 Drawing Sheets

Typical reactive capability curve of a 2MVA synchronous generator

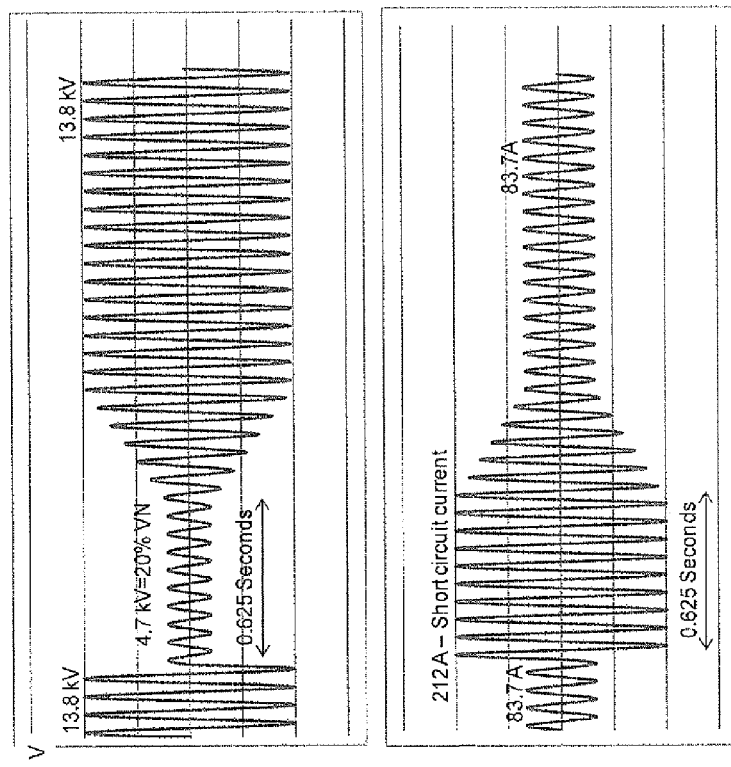

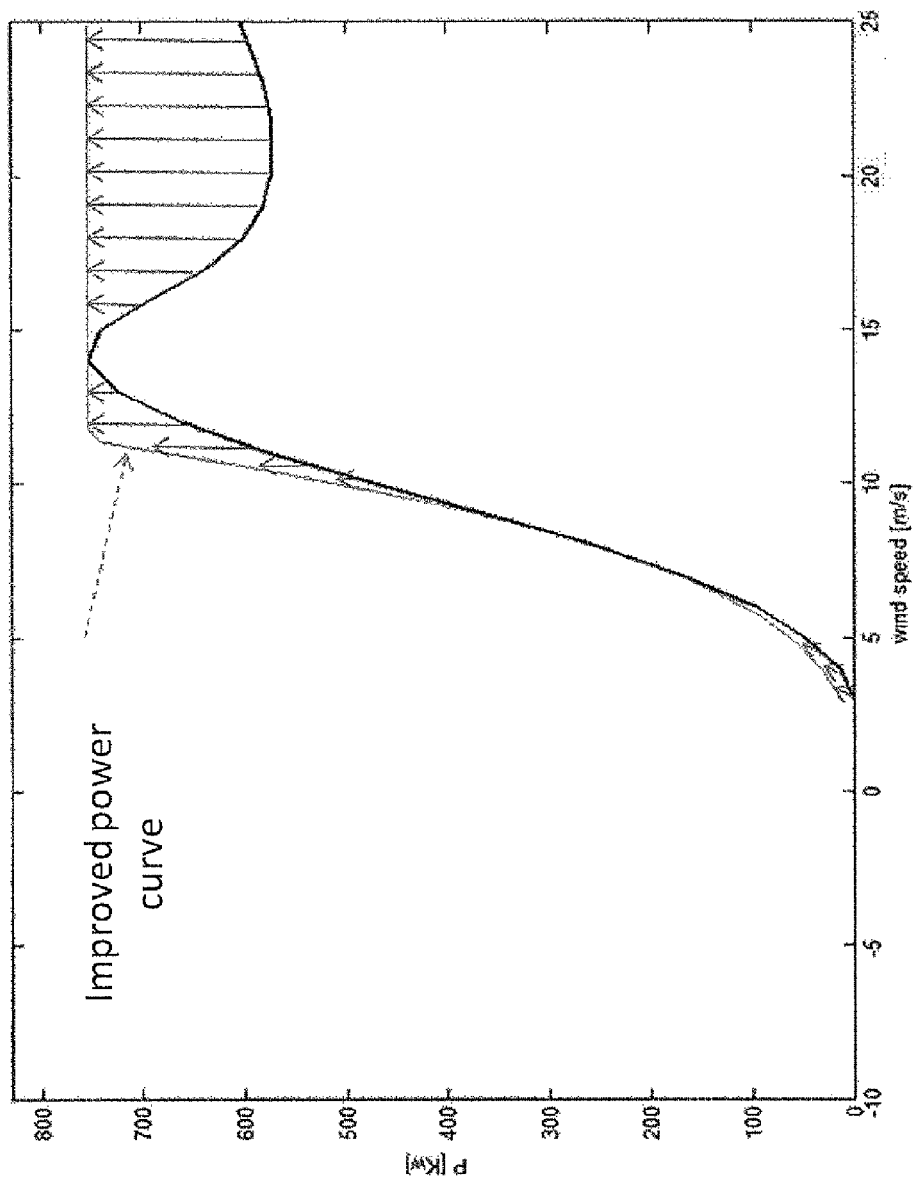

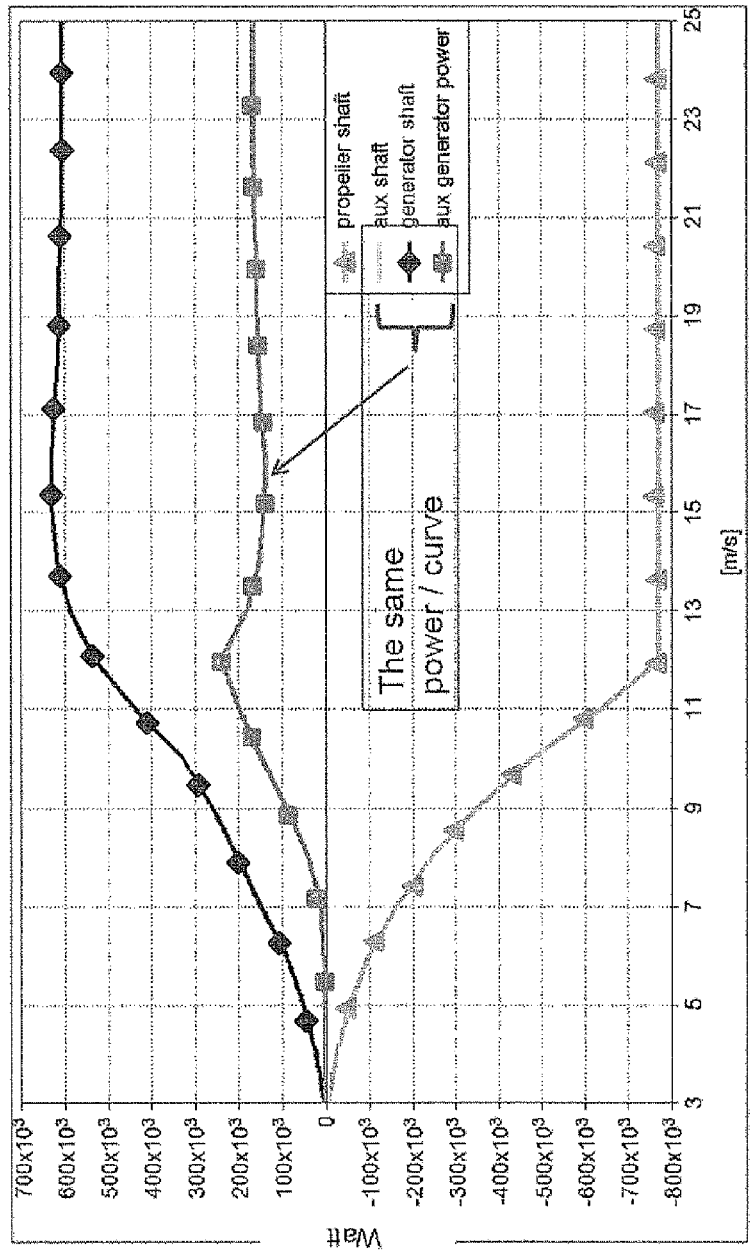

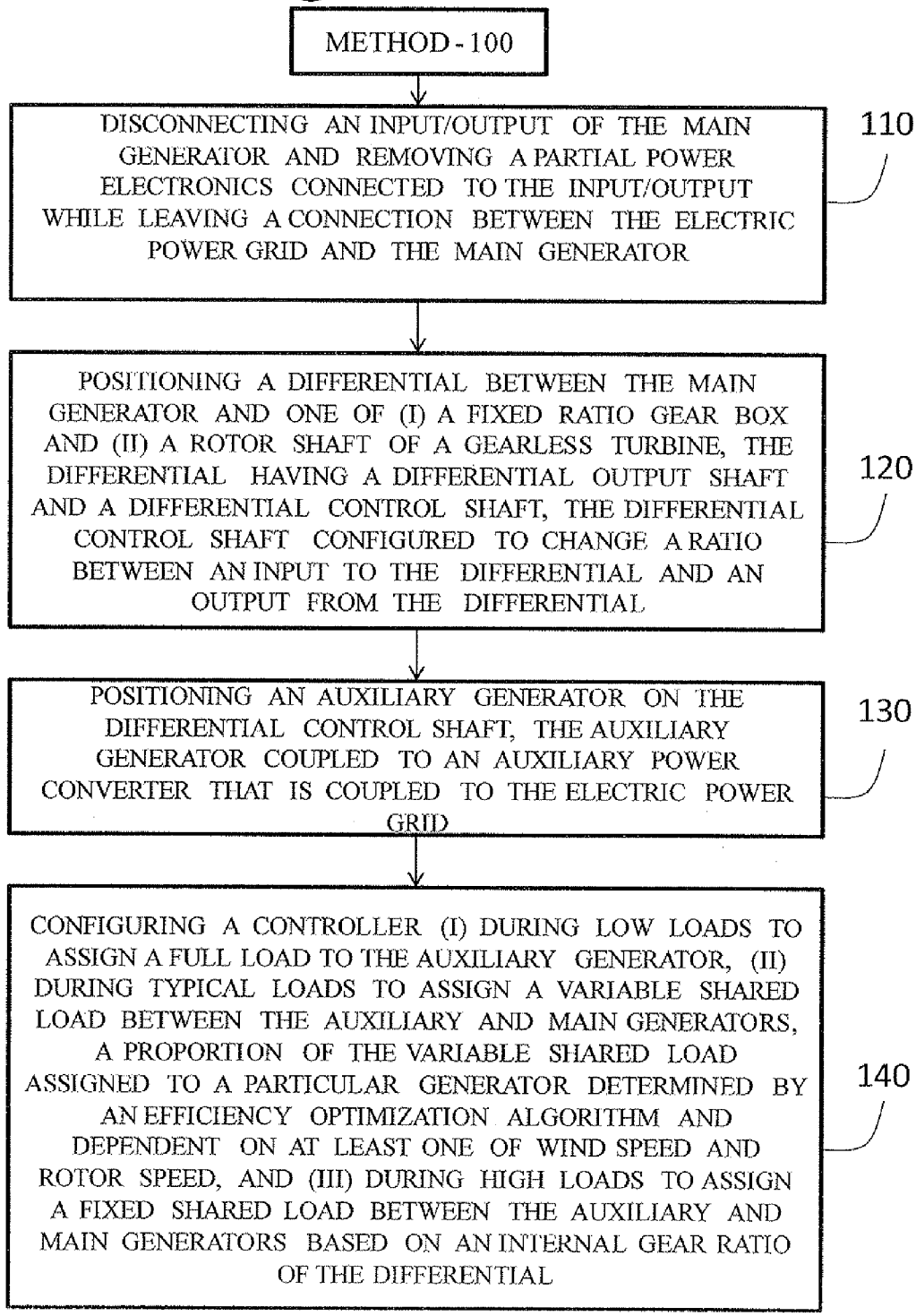

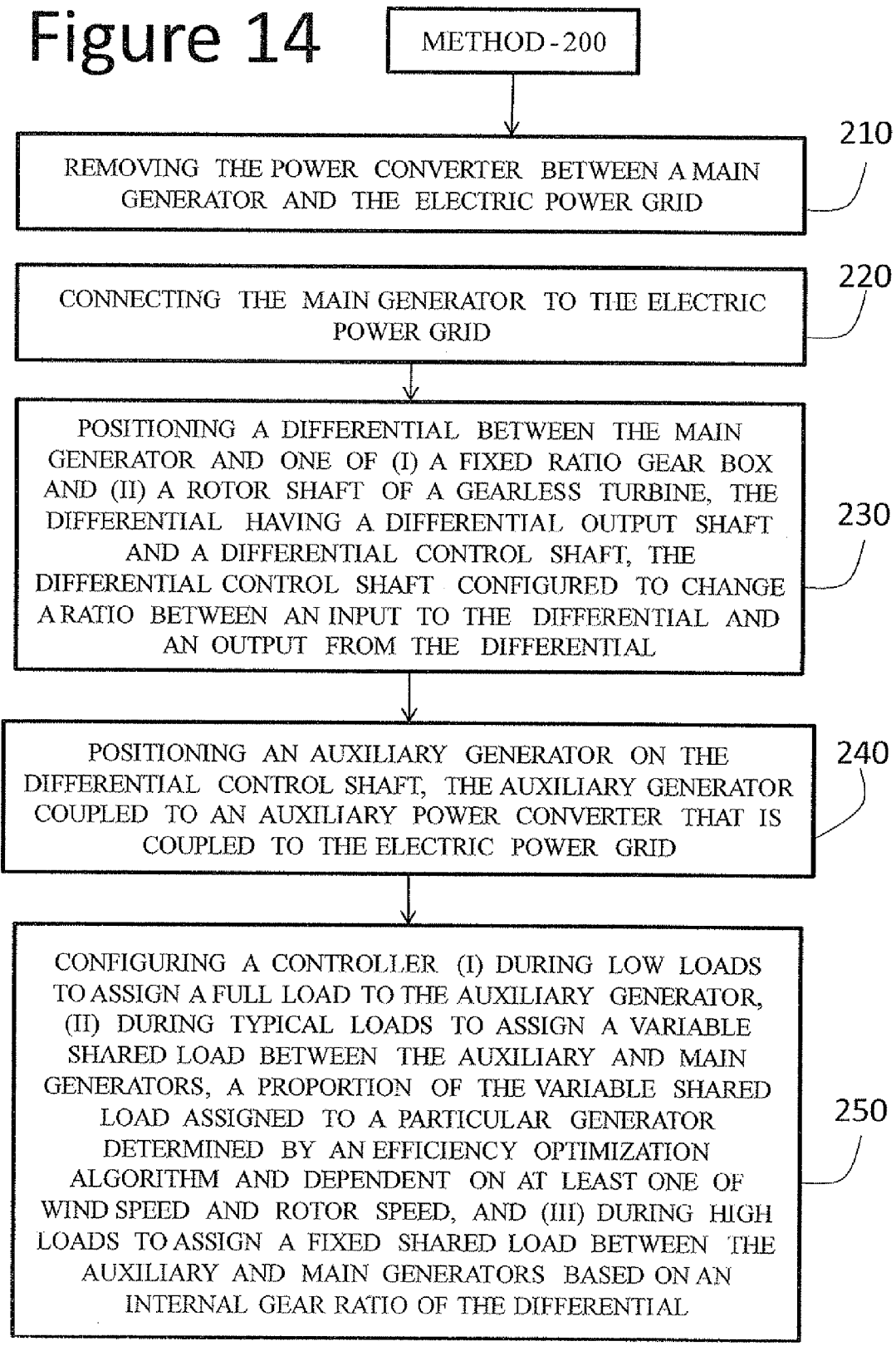

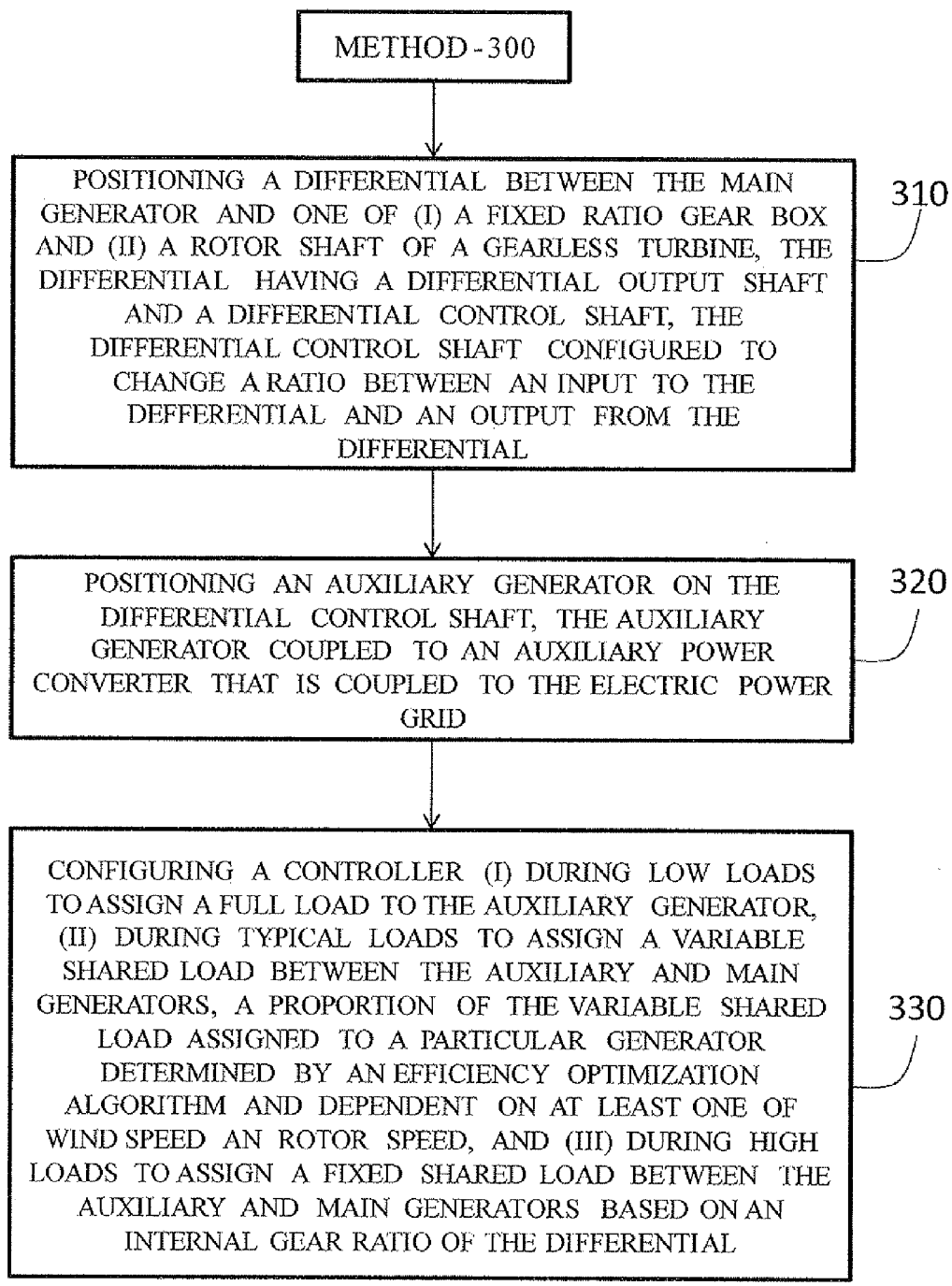

WIND TURBINE WITH VARIABLE SPEED AUXILIARY GENERATOR AND LOAD SHARING ALGORITHM

FIELD AND BACKGROUND OF THE INVENTION

The present invention relates to apparatuses and methods for wind turbines, and, more particularly to retrofitting wind turbines and new wind turbines having a variable speed auxiliary generator and an algorithm for load sharing with the main generator.

Older wind turbines are of the fixed speed and fixed pitch variety. Their efficiency is never optimized because wind speeds vary and wind input varies. Newer wind turbines (doubly fed turbines and fully converted turbines) are of the variable speed and variable pitch variety. They have a variable output from the gear box which creates a variable frequency and voltage from the generator. Then, in order to be coupled directly to the constant frequency and voltage of the electric grid, these wind turbines employ power electronics, i.e. a converter, (or in the case of a doubly fed turbine a partial converter) to convert the variable frequency and voltage of the generator to the constant frequency and voltage of the electric grid. However, this power electronics is (i) very expensive, (ii) of heavy weight, (iii) unreliable and (iv) creates additional losses.

Another problem is that wind turbines have become an increasing percentage of the turbines that connect to electric power grids and have therefore recently come to be more scrutinized for grid compliance. Grid compliance means being configured to be able to help a fallen grid come back up, minimizing reactive power and complying with low voltage ride through requirements.

Another important factor is keeping the cost of manufacturing to a minimum.

In order to maximize production of electrical output, wind turbines should be as efficient as possible. There is a compelling need to have an apparatus and method that will improve the reliability and energy efficiency of wind turbines while providing wind turbines at the exact conditions demanded by electric grids and at reasonable cost. It would be particularly helpful to be able to reap the benefits that the variable speed variable pitch wind turbines have over the fixed speed wind turbines without experiencing the disadvantages of the variable speed wind turbines, and yet to do so at a reasonable cost.

SUMMARY OF THE PRESENT INVENTION

One aspect of the present invention is an assembly for a wind turbine, the wind turbine having a rotor shaft, rotor blades, the assembly comprising a differential on one of (i) a gear set output shaft of a gear set connected to the rotor shaft and (ii) a rotor shaft of a gearless wind turbine, the differential having a differential output shaft and a differential control shaft, the differential control shaft configured to change a ratio between an input to the differential and an output from the differential and adjust rotor speed by increasing or decreasing a speed of the differential; a main generator operating at a constant frequency and coupled to an electric power grid that operates at the constant frequency, the main generator transmitting power to the electric power grid without a power converter, the main generator coupled to the differential output shaft; a variable speed auxiliary generator coupled to the electric grid through auxiliary power electronics, the differential control shaft coupled to the auxiliary generator; a controller configured (i) during low loads to assign a full load to the auxiliary generator, (ii) during typical loads to assign a variable shared load between the auxiliary and main generators, a proportion of the variable shared load assigned to a particular generator determined by an efficiency optimization algorithm and dependent on at least one of wind speed and rotor speed, and (iii) during high loads to assign a shared load between the auxiliary and main generators based on an internal gear ratio of the differential.

A further aspect of the present invention is directed to a method of retrofitting a doubly fed wind turbine that is coupled to an electric power grid through power electronics, the method comprising disconnecting an input/output of a main generator and removing a partial power electronics connected to the input/output while leaving a connection between the electric power grid and the main generator; positioning a differential between the main generator and one of (i) a fixed ratio gear box and (ii) a rotor shaft of a gearless turbine, the differential having a differential output shaft and a differential control shaft, the differential control shaft configured to change a ratio between an input to the differential and an output from the differential; positioning an auxiliary generator on the differential control shaft, the auxiliary generator coupled to an auxiliary power converter that is coupled to the electric power grid; and configuring a controller (i) during low loads to assign a full load to the auxiliary generator, (ii) during typical loads to assign a variable shared load between the auxiliary and main generators, a proportion of the variable shared load assigned to a particular generator determined by an efficiency optimization algorithm and dependent on at least one of wind speed and rotor speed, and (iii) during high loads to assign a fixed shared load between the auxiliary and main generators based on an internal gear ratio of the differential.

A still further aspect of the present invention is a method of retrofitting a fully converted wind turbine that is coupled to an electric power grid through power electronics, the method comprising removing the power converter between a main generator and the electric power grid; connecting the main generator to the electric power grid; positioning a differential between the main generator and one of (i) a fixed ratio gear box and (ii) a rotor shaft of a gearless turbine, the differential having a differential output shaft and a differential control shaft, the differential control shaft configured to change a ratio between an input to the differential and an output from the differential; positioning an auxiliary generator on the differential control shaft, the auxiliary generator coupled to an auxiliary power converter that is coupled to the electric power grid; and configuring a controller (i) during low loads to assign a full load to the auxiliary generator, (ii) during typical loads to assign a variable shared load between the auxiliary and main generators, a proportion of the variable shared load assigned to a particular generator determined by an efficiency optimization algorithm and dependent on at least one of wind speed and rotor speed, and (iii) during high loads to assign a fixed shared load between the auxiliary and main generators based on an internal gear ratio of the differential.

A yet still further aspect of the present invention is directed to a method of retrofitting a fixed speed fixed pitch wind turbine that has a main generator operating at a constant frequency, the main generator coupled without power electronics to a power grid that operates at the constant frequency, the method comprising positioning a differential between the main generator and one of (i) a fixed ratio gear box and (ii) a rotor shaft of a gearless turbine, the differential having a differential output shaft and a differential control shaft, the differential control shaft configured to change a ratio between an input to the differential and an output from the differential; positioning an auxiliary generator on the differential control shaft, the auxiliary generator coupled to an auxiliary power converter that is coupled to the electric power grid; and configuring a controller (i) during low loads to assign a full load to the auxiliary generator, (ii) during typical loads to assign a variable shared load between the auxiliary and main generators, a proportion of the variable shared load assigned to a particular generator determined by an efficiency optimization algorithm and dependent on at least one of wind speed and rotor speed, and (iii) during high loads to assign a fixed shared load between the auxiliary and main generators based on an internal gear ratio of the differential.

A further aspect of the present invention is an assembly an assembly for a wind turbine, the wind turbine having a rotor shaft, rotor blades, the assembly comprising a differential on one of (i) a gear set output shaft of a gear set connected to the rotor shaft and (ii) a rotor shaft of a gearless wind turbine, the differential having a differential output shaft and a differential control shaft, the differential control shaft configured to change a ratio between an input to the differential and an output from the differential, the differential comprising a gear that acts as a speed decreasing stage; a main generator operating at a constant frequency and coupled to an electric power grid that operates at the constant frequency, the main generator transmitting power to the electric power grid without a power converter, the main generator coupled to the differential output shaft; a variable speed auxiliary generator coupled to the electric grid through auxiliary power electronics, the differential control shaft coupled to the auxiliary generator; a controller configured (i) during low loads to assign a full load to the auxiliary generator, (ii) during typical loads to assign a variable shared load between the auxiliary and main generators, a proportion of the variable shared load assigned to a particular generator determined by a efficiency optimization algorithm and dependent on at least one of wind speed and rotor speed, and (iii) during high loads to assign the full load to the main generator.

These and other features, aspects and advantages of the present invention will become better understood with reference to the following drawings, descriptions and claims.

BRIEF DESCRIPTION OF THE DRAWINGS

Various embodiments are herein described, by way of example only, with to reference to the accompanying drawings, wherein:

FIG. 6C is a graph showing how a wind turbine having a synchronous generator in accordance with one embodiment of the present invention meets the Chinese LVRT grid code;

FIG. 7 is a graph showing aerodynamic efficiency improvement of a fixed speed wind turbine retrofitted in accordance with one embodiment of the present invention;

FIGS. 10A-10B is a graph showing an improved power curve of a retrofitted fixed speed wind turbine retrofitted in accordance with one embodiment of the present invention;

FIG. 13 is a flow chart showing a method in accordance with one embodiment of the present invention;

FIG. 14 is a flow chart showing a further method in accordance with a further embodiment of the present invention; and FIG. 15 is a flow chart showing a still further method in accordance with an embodiment of the present invention.

DETAILED DESCRIPTION OF THE INVENTION

Figure 1:
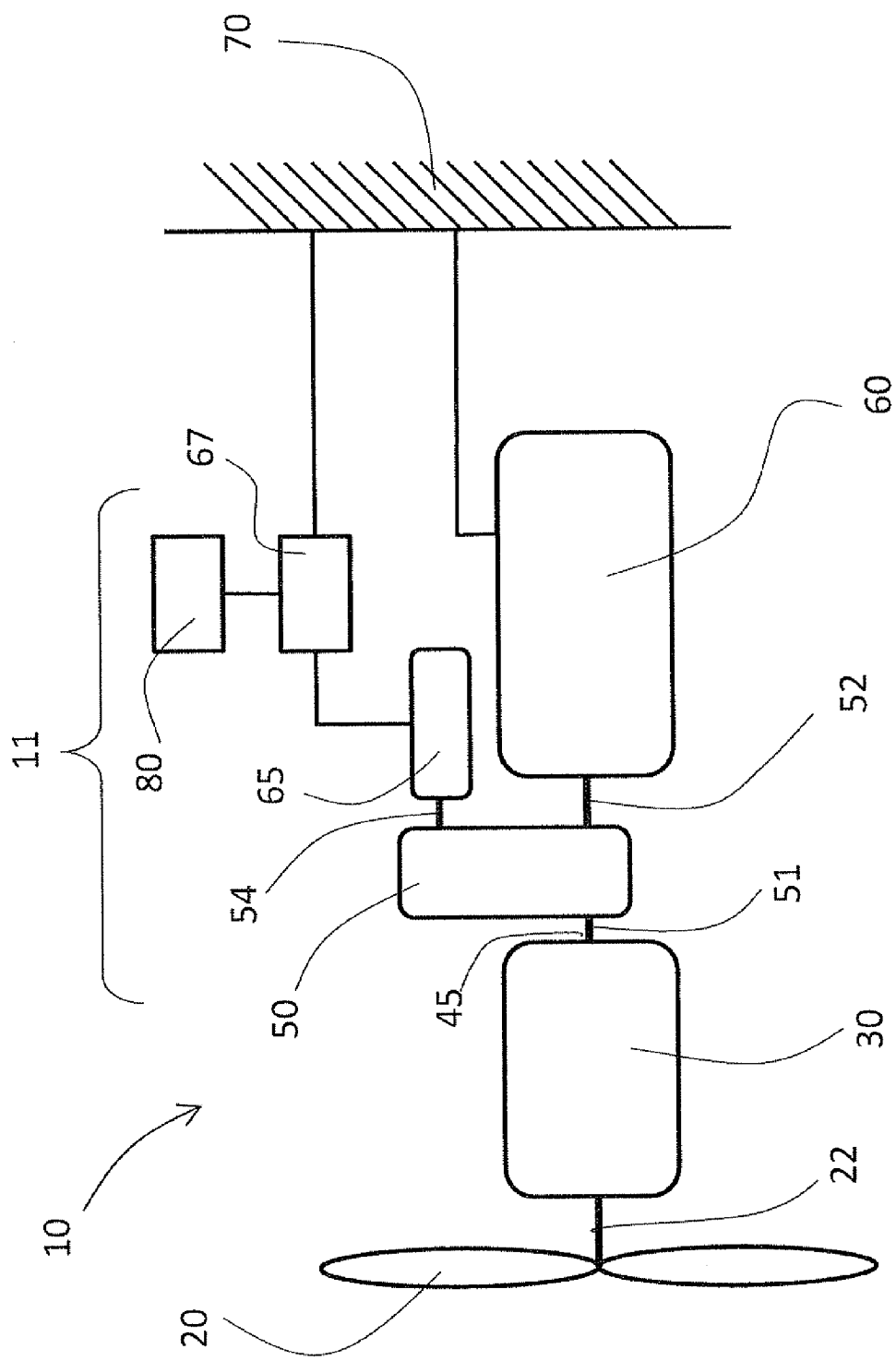
FIG. 1 is a schematic showing a side view of a wind turbine in accordance with one embodiment of the present invention.

The following detailed description is of the best currently contemplated modes of carrying out the invention. The description is not to be taken in a limiting sense, but is made merely for the purpose of illustrating the general principles of the invention, since the scope of the invention is best defined by the appended claims.

The present invention generally provides a new wind turbine or a retrofitted wind turbine (i.e. fixed speed, doubly fed or fully converted) in which an assembly comprising a differential and an auxiliary generator have been added and in which power electronics between the main generator and the electric grid has been removed (except that in the case of a retrofitted fixed speed turbine, no power electronics was in place so none had to be removed). The removed power electronics may be modified for use as an auxiliary power electronics between the auxiliary generator and the electric grid. The original and the retrofitted wind turbine may be gearless or may have a gear set onto which the differential is positioned. The main generator may be over-rated since the power electronics has been removed or is absent. A grid compliance device may be positioned between the grid and the main generator. A controller is configured to assign the load such that at low loads, the auxiliary generator operates. At typical loads, an algorithm may divide the shared load between the main and auxiliary generators variably for example depending on wind speed. At high loads the controller may be configured to assign the loads to both the main and auxiliary generators such that both generators are at full load. Alternatively, if a step-down differential is used, at high loads only the main generator may operate and the auxiliary generator may be mechanically locked.

In contrast to prior art wind turbines that use one generator, or that use multiple generators of the same power level or that use multiple generators that are of the same type (i.e. all fixed speed generators, or all generators that are connected in the same way to the electric power grid), the present invention may use multiple generators one of which may be a large main generator that operates at constant frequency and may be connected to the power grid without power electronics and another of which is a variable speed auxiliary generator that is small relative to the main generator and may be connected of the electric grid using a small auxiliary power converter. In still further contrast to the prior art, in which the efficiency of the wind turbine cannot be optimized either because a fixed speed gear box cannot handle the variability in the wind speed or because a variable ratio gear box cannot avoid the use of power electronics, the wind turbine of the present invention may be able to maximize energy efficiency by using a controller to apply an algorithm for optimum load sharing. In further contrast to prior art wind turbines that either do not use multiple generators or do not use a load sharing algorithm that optimizes efficiency of electrical output production, the wind turbine of the present invention may utilize a controller that during low loads may assign a full load to the auxiliary generator, during typical loads may assign a variable shared load between the auxiliary and main generators as determined by a heuristic efficiency optimization algorithm and during high loads may assign a shared load between the auxiliary and main generators based on the internal gear ratio of the differential. In contrast to prior art variable speed variable pitch wind turbines, in which a variable speed output from the fixed-speed gearbox was transmitted to a variable frequency generator that was coupled to the power grid using power electronics, the wind turbine of the present invention may avoid the use of power electronics altogether. This avoids the expense and heavy weight of power electronics and renders the turbine more reliable and energy efficient. In contrast to prior art wind turbines that avoid power electronics but that require entirely new gear structures that may be expensive to manufacture and test, the present invention does not require a new gear structure and may allow retrofitting of an existing wind turbine by adding a differential, an auxiliary generator and by in some case using the existing power electronics as an auxiliary power electronics for the auxiliary generator. In contrast to prior art variable speed variable pitch wind turbines, which produce a variable output frequency for the generator, the wind turbine of the present invention may be able to produce a fixed speed output from a variable speed input. In still further contrast to prior art assemblies for wind turbines, which may not be applicable to both fixed speed fixed pitch wind turbines as well as doubly fed and fully converted variable speed variable pitch wind turbines, the present invention may be retrofitted into all three of these kinds of wind turbines, as described in the methods of the present invention relating to retrofitting. In still further contrast to prior art doubly fed and fully converted wind turbines, in which power electronics is used between the generator and the electric gris, which is very expensive, of heavy weight and unreliable, the wind turbine of the present invention does not require the power electronics between the main generator and the electric grid, but rather only minimal auxiliary power electronics between the auxiliary generator and the electric grid and thereby avoids these drawbacks, while still reaping the benefits of a variable speed variable pitch wind turbine—namely optimizing efficiency from varying wind speeds and wind input. Furthermore, the avoidance of having to use power electronics between the main generator and the electric grid also allows the turbine of the present invention to over-rate the main generator during high loads, something that is not possible with prior art doubly fed and fully converted turbines. Moreover, during typical and high loads, unlike the prior art doubly fed and fully converted wind turbines, the wind turbine of the present invention will not suffer converter losses. In addition, by using an auxiliary generator besides the main generator, there may be increased capacity at high loads when the main and auxiliary generators are being used at rated capacity. For example, if the main generator is rated at 1.5 megaWatts and the auxiliary generator is rated at 0.3 megaWatts, the capacity of the new wind turbine is 1.8 megaWatts since the main and auxiliary generators are configured in parallel. In contrast to the doubly fed wind turbines of the prior art, the retrofitted doubly fed wind turbines of the present invention may increase efficiency. For example, at low loads an increase in efficiency of approximately 2 to 3% may be gained by using only the auxiliary generator. An increase in efficiency of approximately 2 to 4% at typical loads may be gained by eliminating converter losses. An increase in efficiency of approximately 12% at high loads may be gained by allowing over-rating. Combined, this may allow a total additional energy yield of approximately 8% to 11% annually per megaWatt, which may translate to approximately $24,000 to $33,000 per megaWatt annually for doubly fed turbines. Furthermore, existing power electronics may be modified to be used as auxiliary power electronics for the auxiliary generator, thereby saving further costs. The retrofit of an existing doubly fed wind turbine has been estimated to cost $20,000. In still further contrast to prior art wind turbines, the assembly and wind turbine of the present invention may allow use of a smaller auxiliary generator relative to the main generator. This is because in some embodiments, particularly but not necessarily only for a doubly fed turbine, the presence of a differential that acts as a speed decreasing gear stage (within an overall speed increasing collection of gear stages) allows that during high loads the auxiliary generator may be halted and the high torque held mechanically, such as by a friction brake rather than held electrically. Moreover, in further contrast to the prior art, which does not use a step-down differential as part of an overall speed increasing collection of gears, in the present invention, by retrofitting a doubly fed turbine with a step-down or speed decreasing differential, rotor speed variability may be increased. Accordingly, at low wind speeds, the rotor may rotate slower. This may improve the aerodynamic efficiency of the turbine at low wind speed and allow the production of more power The principles and operation of a method and apparatus for a wind turbine with a variable speed auxiliary generator and a load sharing algorithm according to the present invention may be better understood with reference to the drawings and the accompanying description.

Generally, the present invention may include four scenarios (a) a new wind is turbine, (b) a retrofitted fixed speed (FS) wind turbine, (c) a retrofitted doubly fed (DF) variable speed variable pitch wind turbine and (d) a retrofitted fully converted (FC) variable speed variable pitch wind turbine. In all four scenarios, the result is essentially the same (except that the retrofitted fixed speed wind turbine will have a fixed speed rotor). The new wind turbine is typically variable speed variable pitch although the new wind turbine could be of the fixed speed variety.

Figure 2:
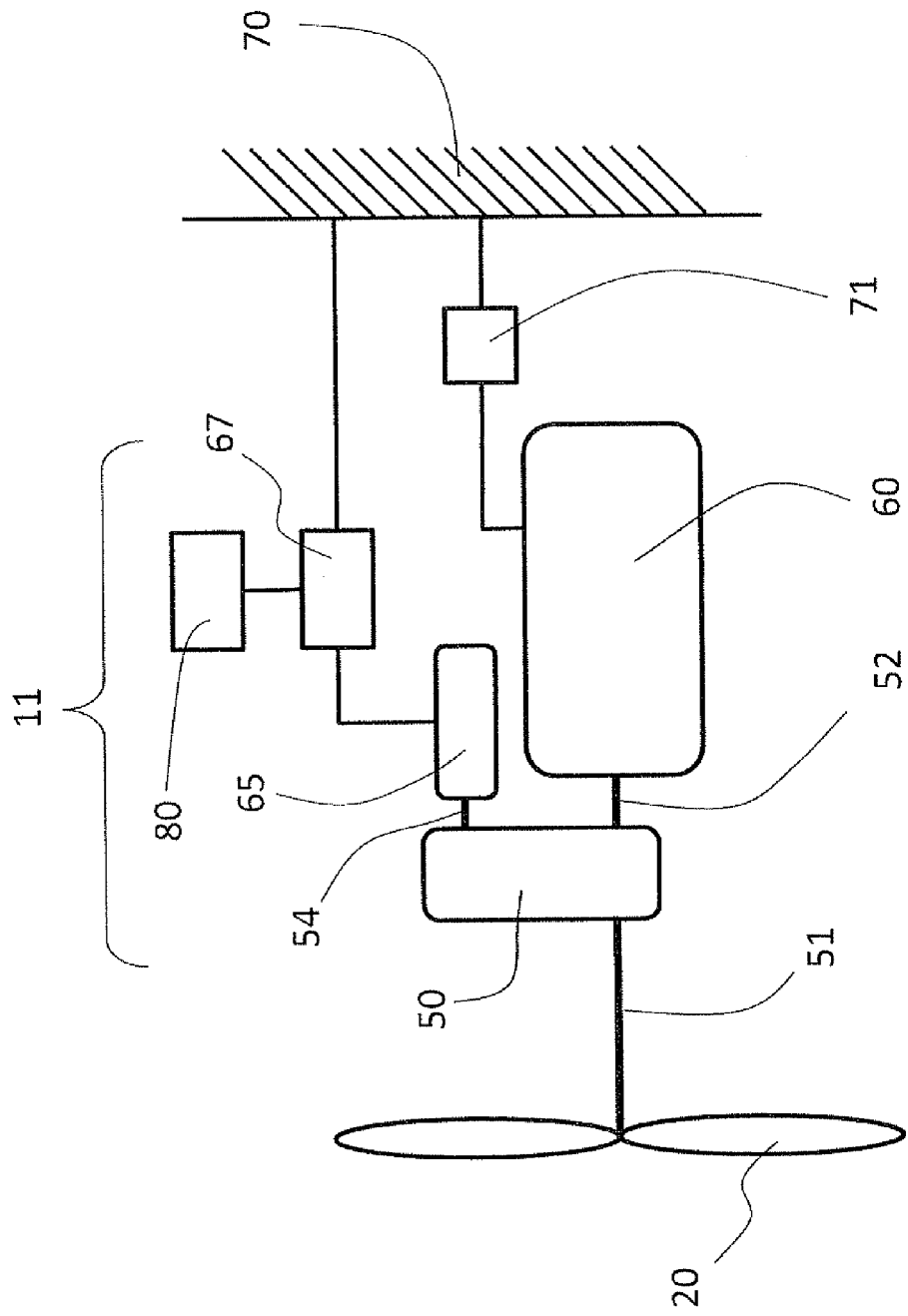
FIG. 2 is a schematic showing a side view of a gearless wind turbine in accordance with one embodiment of the present invention.
Figure 9:
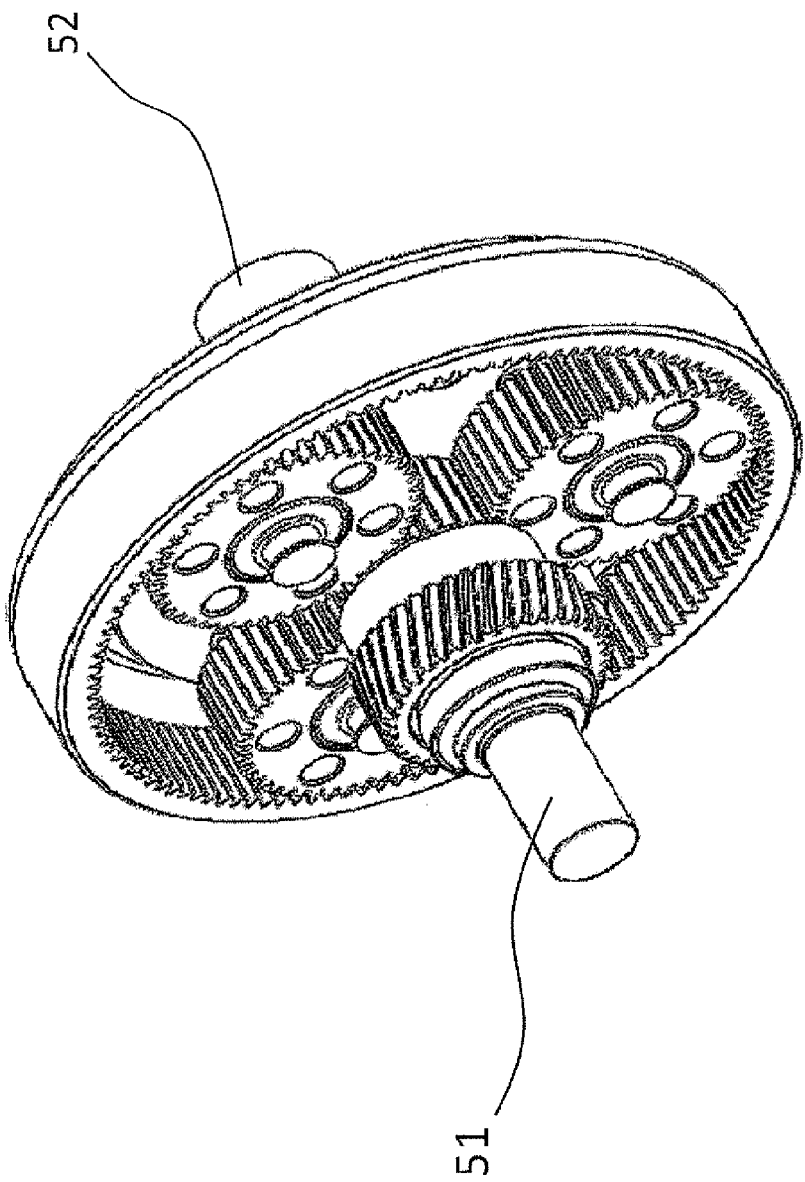
FIG. 9 is an isometric view of a planetary differential of an assembly in accordance with one embodiment of the present invention.

FIG. 1 depicts a wind turbine that is either a new wind turbine or a retrofitted wind turbine (i.e. DF, FC or FS) retrofitted in accordance with the present invention. As seen in FIG. 1, a wind turbine 10 may comprise a rotor shaft 22 having thereon rotor blades 20 exposed to wind energy. Wind turbine 10 may also have a gear set 30 on rotor shaft 22 or coupled to rotor shaft 22. As shown in FIG. 9, gear set 30 may be a planetary gear set and may have a stationary ring, a sun gear 57, a In some preferred embodiments, as shown in FIG. 2, wind turbine 10 may be a gearless wind turbine.

The assembly of the present invention which may be used to retrofit any of the wind turbines (DF, FC or FS) has been assigned reference numeral "11" and this assembly 11 may form part of the wind turbine 10, which may be a new wind turbine or a retrofitted wind turbine. Wind turbine 10 is depicted in FIG. 1 and may have a rotor shaft, rotor blades. Typically, although not necessarily, the wind turbine also has a gear set.

As seen in FIG. 1, assembly 11 forming part of turbine 10 may also include a differential 50 on the gear set output shaft 45. Differential 50 may be a variable ratio gear set and may split the torque and may output the torque to main generator 60 and an auxiliary generator 65. Differential 50 may be a planetary differential and may have a differential output shaft 52 and a differential control shaft 54. Differential control shaft 54 may reduce or eliminate torque spikes in gear set 30. Note that differential 50 may also have a differential input shaft 51 that may be connected to or may double as gear set output shaft 45.

Figure 12:
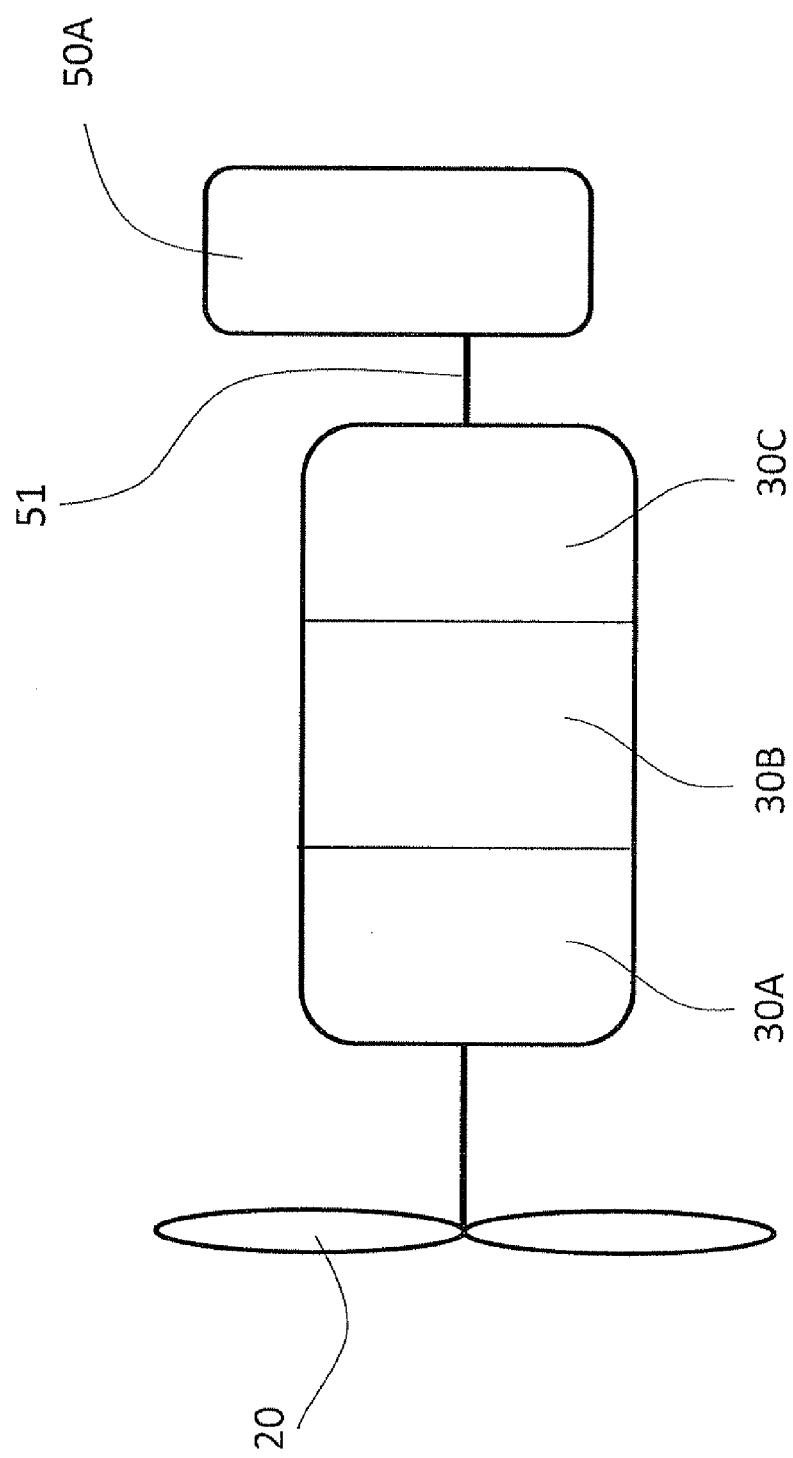
FIG. 12 is a schematic showing the step-down differential as part of a speed increasing collection of gears in accordance with one embodiment of the present invention.

Differential 50 may be a gear set that may be positioned on a gear set output shaft of a gear set connected to the rotor shaft 22 or, in the event that the wind turbine is a gearless wind turbine, may be positioned on a rotor shaft 22, The differential control shaft 54 may be configured to change a ratio between an input to the differential 50 and an output from the differential 50 and to adjust the speed of rotor 20 by increasing or decreasing a speed of the differential Differential 50 may be a gear set that is configured to act as a speed decreasing stage or may be a gear set that is configured to act as a speed increasing stage. When the differential 50 is a step-down differential functioning as a speed decreasing stage, as shown in FIG. 12, it may be coupled to a gear set 30 that is a speed increasing stage so that the overall effect of all the gear stages is to increase the speed of the shaft 22 to meet the requirements of the main generator 60 since the main generator 60 rotates much faster than the rotor 20. In one scenario shown in FIG. 12, three gear increasing stages (typically of fixed gear ratio) 30A, 30B, 30C are followed by the speed decreasing stage of the differential 50. The case of the step-down differential 50A is discussed separately below because it may be associated with a controller that is configured differently for high loads in that the auxiliary generator may be locked. In the main discussion, in particular the discussion of controller 80, the differential is assumed to act as a speed increasing gear stage.

Figure 5:
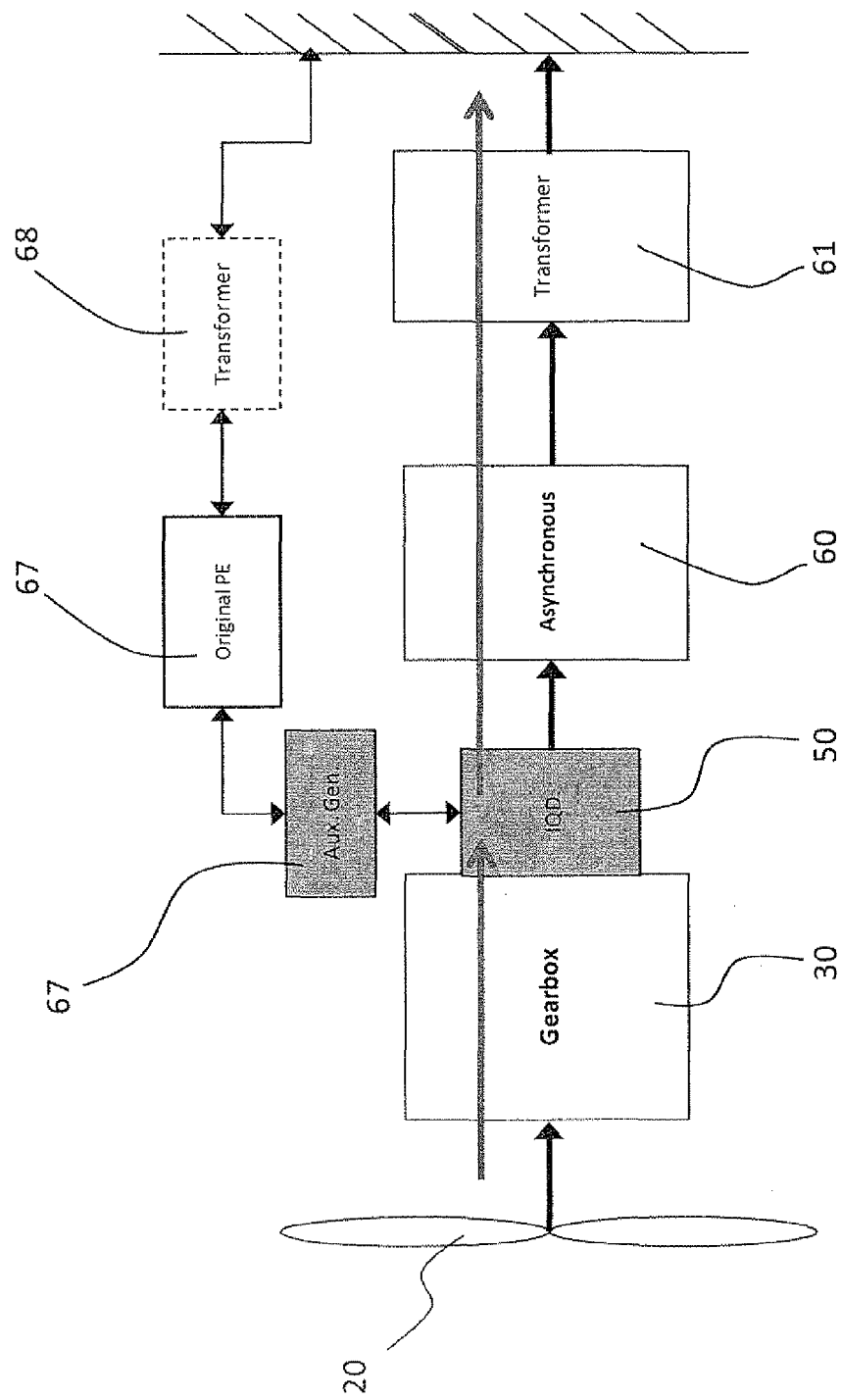
FIG. 5 is a schematic showing a wind turbine having an asynchronous generator and an assembly in accordance with a further embodiment of the present invention.

As seen from FIG. 1, assembly 11 of wind turbine 10 may include a main generator 60 coupled to the differential output shaft 52. Since the output of the differential 50 may be a fixed rotational speed, generator 60 may have a constant speed that may allow the main generator 60 to produce power at a constant frequency and be connected to an electric power grid 70 without a rectifier or power converter. As shown in FIG. 5, a transformer 61 may be present between main generator 60 and power grid 70 and a transformer 68 may be present between grid 70 and auxiliary power electronics 67. In each of the various embodiments, main generator 60 may be induction (asynchronous) or synchronous, as well as Permanent Magnet Generator (PMG), or hybrid PMG. Therefore, the varying power demands of the electric power grid 70 may be met by wind turbine 10 without the need for power electronics (except for auxiliary power converter as described below).

Main generator 60 may be connected to power grid 70 through flexible coupling 66. In Europe, a power grid frequency is 50 Hz, which would require that a generator connected to such a power grid be set to operate at a constant frequency of 50 Hz. Generally, this frequency may translate to a rotational speed of 1500 rpm. In North America the power grids may operate at frequencies of 60 Hz which may translate to a generator rotational speed of 1800 rpm.

Assembly 11 of wind turbine 10 may also include a variable speed auxiliary generator 65 coupled to the electric grid 70 through auxiliary power electronics, such as a small auxiliary power converter 67. On the other side of auxiliary generator 65, the differential control shaft 52 may be coupled to the auxiliary generator 65. Auxiliary generator 65 may be induction (asynchronous) or Synchronous, as well as Permanent Magnet Generator (PMG), or Hybrid. PMG and the type selected may be made independently of the selection of the type of the main generator 60. Auxiliary generator 65 may be approximately 20% of the size of the main generator 60 in terms of power capacity.

Auxiliary generator 65 may be designed with custom-tailored specifications for the wind turbine of the present invention. Auxiliary generator 65 may for example be a pmg generator that may operate at 10,000 rpm and constant torque, which is unusual for a small generator and non-standard for a wind turbine.

Assembly 11 of wind turbine 10 may also include a controller 80 configured to assign the load of the wind turbine to one or both generators 60, 65 depending on the load. As seen from FIG. 1 and FIG. 8, controller 80 may be connected to auxiliary power electronics 67 and in that way controller 80 may control the speed of auxiliary generator 65. "Low loads" are loads existing in the wind turbine during periods when the wind speed is from 3 to 4 meters per second. "Typical loads" are loads existing in the wind turbine when wind speeds are from to to 12 meters per second. "High loads" are loads existing in the wind turbine when wind speeds are from 12 to 24-25 meters per second. Above 25 m/s, the turbine may be shut down.

Figures 3A, 3B:
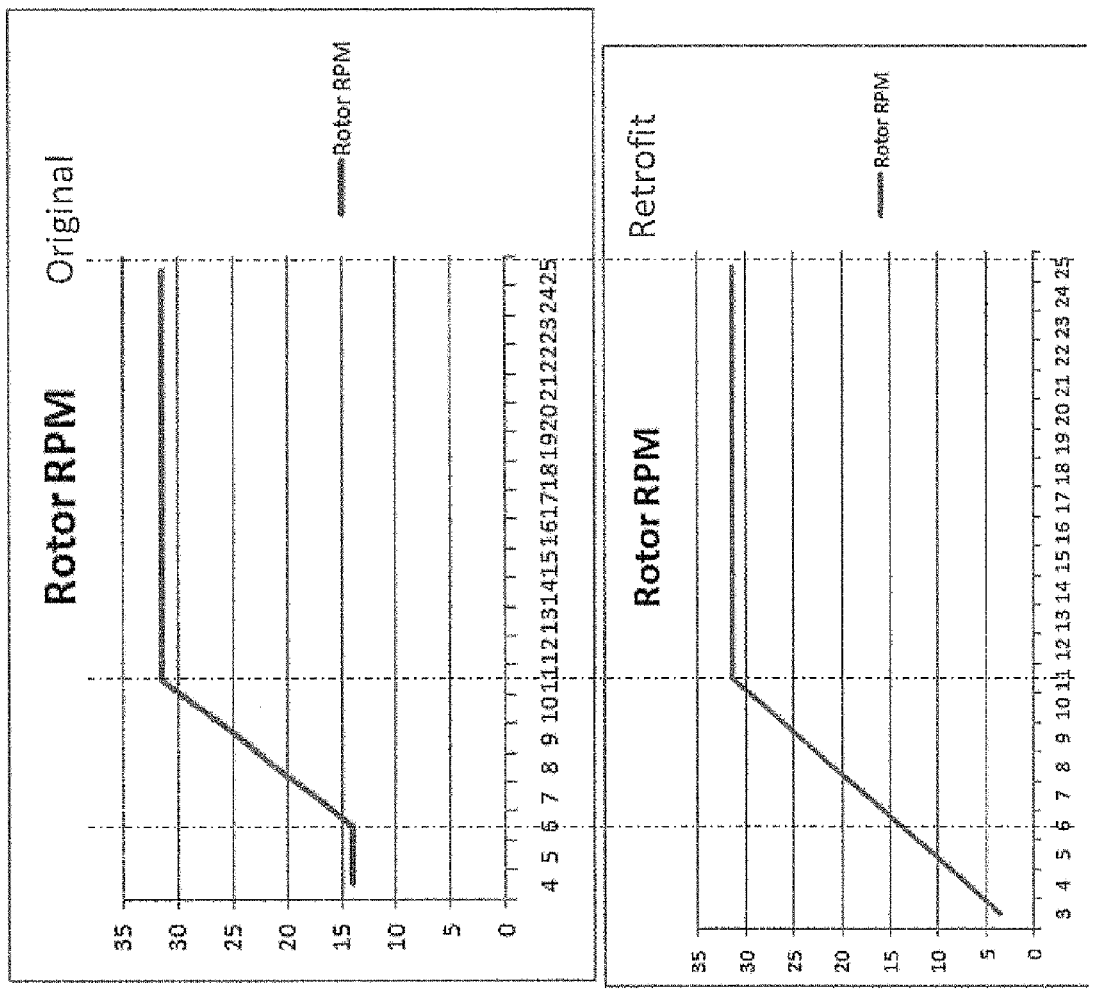
FIG. 3A is a graph of a rotor rpm of a prior art doubly fed wind turbine.
FIG. 3B is a graph of a rotor rpm of a doubly fed wind turbine having an assembly in accordance with one embodiment of the present invention.
Figure 4:
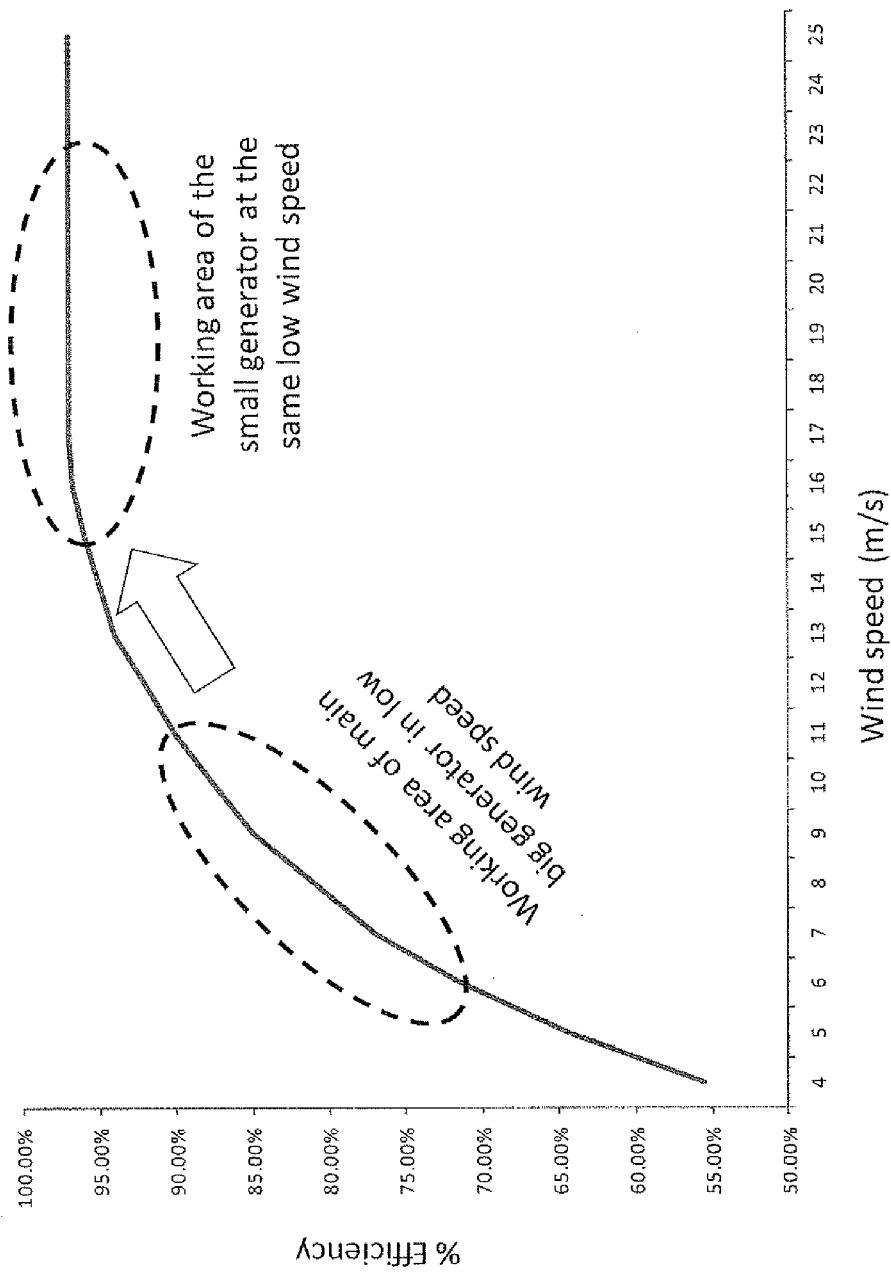
FIG. 4 is a graph showing improved efficiency using an auxiliary generator at low loads, in accordance with one embodiment of the present invention.

For example, during low loads, controller 80 may assign a full load of the wind turbine 10 to auxiliary generator 65. This may greatly increase efficiency since it may allow rotor 20 to rotate slower on low wind speeds. This advantage may be appreciated by comparing the graph of FIG. 3B, showing the doubly fed wind turbine that has been retrofitted in accordance with assembly 11, with a prior art doubly fed wind turbine of FIG. 3A. FIGS. 3A and 3B show that by retrofitting a doubly fed turbine with a step-down differential, rotor speed variability may be increased. Accordingly, at low wind speeds, the rotor may rotate slower. This may improve the aerodynamic efficiency of the turbine at low wind speed and allow the production of more power. The advantage in efficiency may also be seen from FIG. 4.

During typical loads, controller 80 may assign a variable shared load between the auxiliary and main generators, a proportion of the variable shared load assigned to a particular generator determined by an algorithm, for example an efficiency optimization algorithm. The algorithm, which may be a heuristic algorithm, may assign the load depending on wind speed or depending on rotor speed. Controller 80 may be configured to assign the variable shared load during typical loads such that both the main and auxiliary generators 60, 65 are partially loaded.

During high loads, controller 80 may assign a shared load between the auxiliary generator 65 and main generator 60 based on the internal gear ratio of the differential. For example, if main generator 60 is rated 1.5 Mw and auxiliary generator 65 is rated 0.3 Mw, the shared load may be assigned as fixed percentage of 5/6 (or 83 and 1/3%) to main generator and 1/6 (or 16 and 2/3%) to auxiliary generator 65. Accordingly, the shared load may be a fixed shared load in contrast to the variable shared load assigned during typical loads. Controller 80 may be configured to assign the fixed shared load during high loads such that both the main and auxiliary generators are fully loaded. In another option, (where the differential is a step-down differential) the auxiliary generator 65 may be locked by the controller and the main generator may handle the full load. Main generator 60 may have to be overrated to accomplish this but this is possible since the power electronics have been removed from between the main generator 60 and the grid 70.

Controller 80 may include a control motor (not shown) in order to regulate the speed of auxiliary generator 65 through auxiliary power electronics 67 and thereby regulate differential 50. Controller 80 may also include a processor (not separately shown) that may apply an algorithm, such as a heuristic algorithm, for optimizing the load sharing between the main generator 60 and auxiliary generator 65. The algorithm, may output a load sharing proportion that depends on or that is based on the speed of the rotor shaft (or rotor) of the wind turbine or the wind speed.

The present invention also contemplates a wind turbine (new or retrofitted) in which there are a plurality of main generators and/or a plurality of auxiliary generators.

Assembly 11 may be viewed as excluding the main generator 60 in any of the above embodiments. In this case, assembly 11 may only include those parts of the new or retrofitted wind turbine that have been added, such as the differential 50, the auxiliary generator 65, the controller 80 and optionally any auxiliary power converter or a grid compliance device 71.

As shown in FIG. 13, the present invention may also be characterized as a method 100 of retrofitting a doubly fed wind turbine that is coupled to an electric power grid through power electronics. Method 100 may comprise a step 100 of disconnecting the input/output of the rotor of the main generator 60 and removing the partial power electronics connected to the input/output while leaving a connection between the stator output of the main generator 60 and the electric power grid. The partial power electronics may be discarded (i.e. not used in assembly 11) or in some cases may be adapted or modified so as to be used as the auxiliary power electronics of the auxiliary generator.

Method 100 may also involve a step 120 of positioning a differential between the main generator and one of (i) a fixed ratio gear box and (ii) a rotor shaft of a gearless turbine, the differential having a differential output shaft and a differential control shaft, the differential control shaft configured to change a ratio between an input to the differential and an output from the differential. The differential 50 may be a step up or speed increasing gear. Otherwise, differential 50 may be a step down or gear decreasing gear that is part of a gear box that overall is a speed increasing gear and that has several other gear increasing stages.

In an additional step 130, an auxiliary generator 65 may be positioned on the differential control shaft. The auxiliary generator may be coupled to an auxiliary power converter that is coupled to the electric power grid.

Method 100 may also incorporate a step 140 of configuring a controller 80 to assign the load of the wind turbine to one or both generators depending on the type of load. For example, (i) during low loads to assign a full load to the auxiliary generator, (ii) during typical loads to assign a variable shared load between the auxiliary and main generators, a proportion of the variable shared load assigned to a particular generator determined by an efficiency optimization algorithm (which may be heuristic) and dependent on at least one of wind speed and rotor speed, and (iii) during high loads to assign a shared load, which may be a fixed share, between the auxiliary and main generators based on the internal gear ratio of the differential.

Figure 6A:
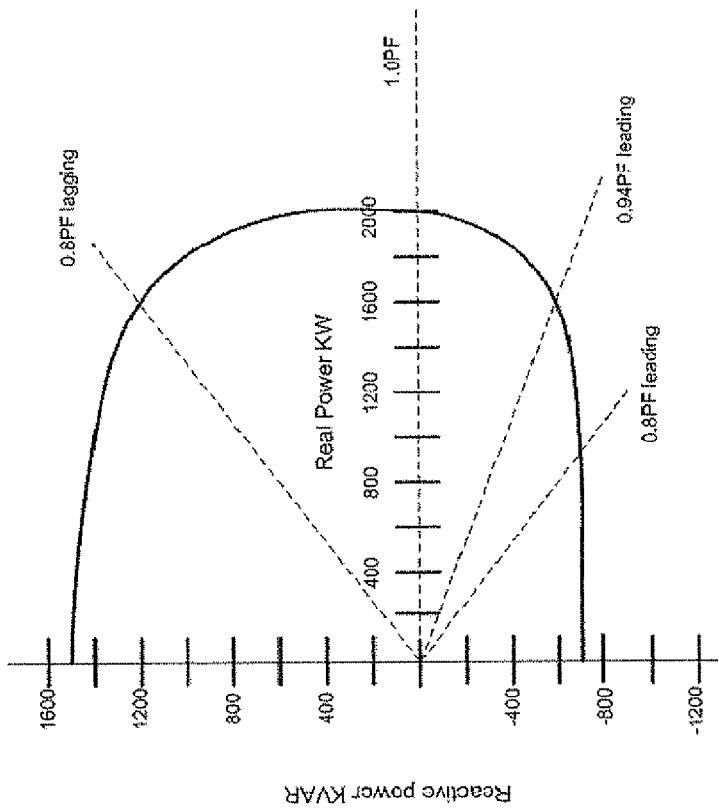
FIG. 6A is a graph showing the reactive power management of a synchronous generator used in accordance with one embodiment of the present invention.
Figure 6B:
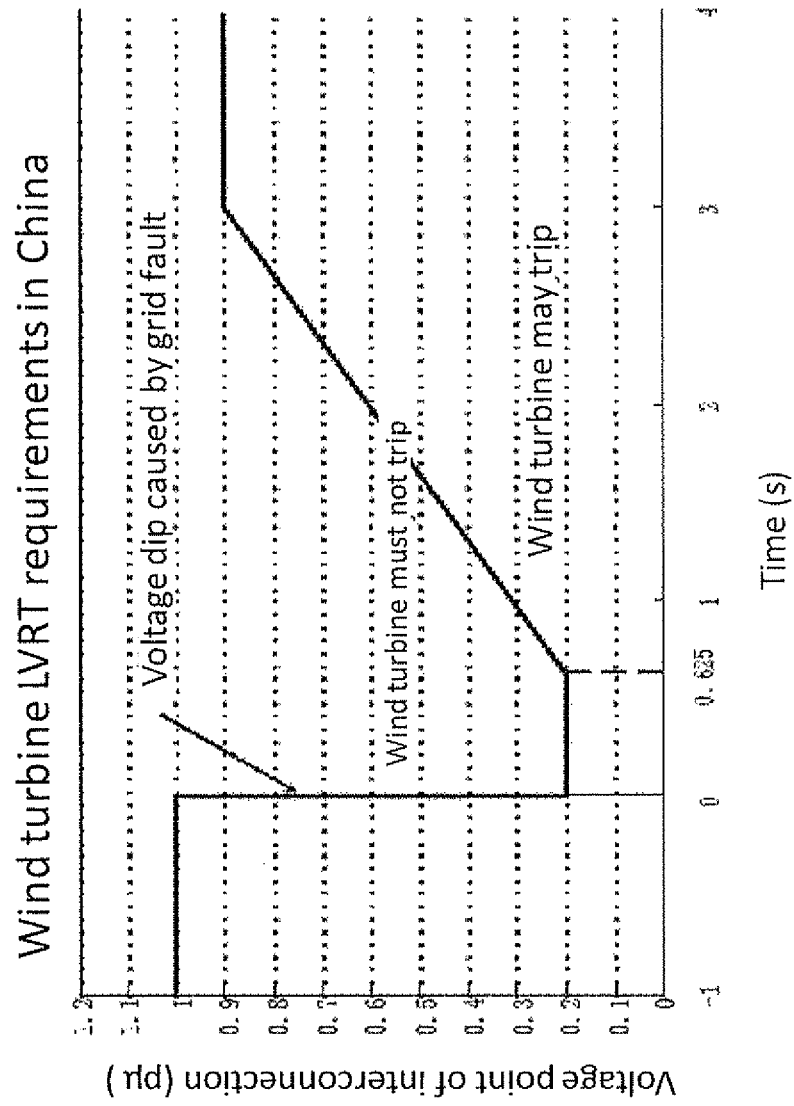
FIG. 6B is a graph showing the low voltage ride through requirements in China.

Method 100 may further comprise a step of replacing the main generator with a synchronous generator (or with a PMG or hybrid PMG). This may increase efficiency further because it provides optimal grid code compliance (low voltage ride trough, reactive power management, etc.). This has become more important since as wind turbines become an important part of electrical grids, their ability to connect to the grid like regular power stations becomes critical. FIG. 6A shows the reactive power management of a synchronous generator. FIG. 6B shows the low voltage ride through requirements in China for a turbine. A wind turbine must be able to remain on line for 0.625 seconds when the voltage at the interconnection point drops down to 20% of the rated voltage. In addition, a wind turbine must be able to remain on line when the voltage at the interconnection point recovers to 90% of the rated voltage within three seconds. FIG. 6C shows that a synchronous generator's response to a three phase grid voltage drop as defined by the Chinese LVRT code is excellent. For example, in the case of a three-phase short circuit, the external excitation permits sustained short circuit current of 200% to 300% of rated current. The permissible duration of the short circuit is 5 seconds, which comfortably complies with the grid code requirements.

Method 100 may also include a step of adapting or modifying the removed power electronics (i.e. power converter) so the removed power converter can be used as the auxiliary power converter. Method 100 may also include a step of positioning a grid compliance device 71 between the main generator and the electric power grid.

As shown in FIG. 14, the present invention may also be characterized as a method 200 of retrofitting a fully converted wind turbine that is coupled to an electric power grid through power electronics. Method 200 may comprise a step 210 of removing the power electronics (i.e. power converter) between main generator 60 and the electric power grid 70. A further step 220 may include connecting the main generator 60 to the electric power grid 70.

Method 200 may also comprise a step 230 of positioning a differential 50 between the main generator and one of (i) a fixed ratio gear box and (ii) a rotor shaft of a gearless turbine, the differential having a differential output shaft and a differential control shaft, the differential control shaft configured to change a ratio between an input to the differential and an output from the differential. The differential 50 may be a speed increasing gear, or may be a speed decreasing stage within an overall collection of gears that, overall, are speed increasing. For example, following three stages of speed increasing gears in a drive train, the differential 50 may act as a speed decreaser.

In a further step 240, an auxiliary generator 65 may be positioned on the differential control shaft, the auxiliary generator coupled to an auxiliary power converter that is coupled to the electric power grid Method 200 may also comprise a step 250 of configuring a controller to assign the load of the wind turbine to one or both generators depending on the type of load. For example, (i) during low loads to assign a full load to the auxiliary generator, (ii) during typical loads to assign a variable shared load between the auxiliary and main generators, a proportion of the variable shared load assigned to a particular generator determined by an efficiency optimization algorithm (which may be heuristic) and dependent on at least one of wind speed and rotor speed, and (iii) during high loads to assign a shared load (which may be a fixed shared load) between the auxiliary and main generators based on the internal gear ratio of the differential.

Method 200 may, in some preferred embodiments, include a step of replacing the main generator with a synchronous generator (or with a PMG or hybrid PMG). Method 200 may also include, in some preferred embodiments, a step of modifying the removed power electronics so as to use the removed power electronics as the auxiliary power converter. In some preferred embodiments, a further step of positioning a grid compliance device 71 between the main generator and the electric power grid may be included.

Figure 10A:
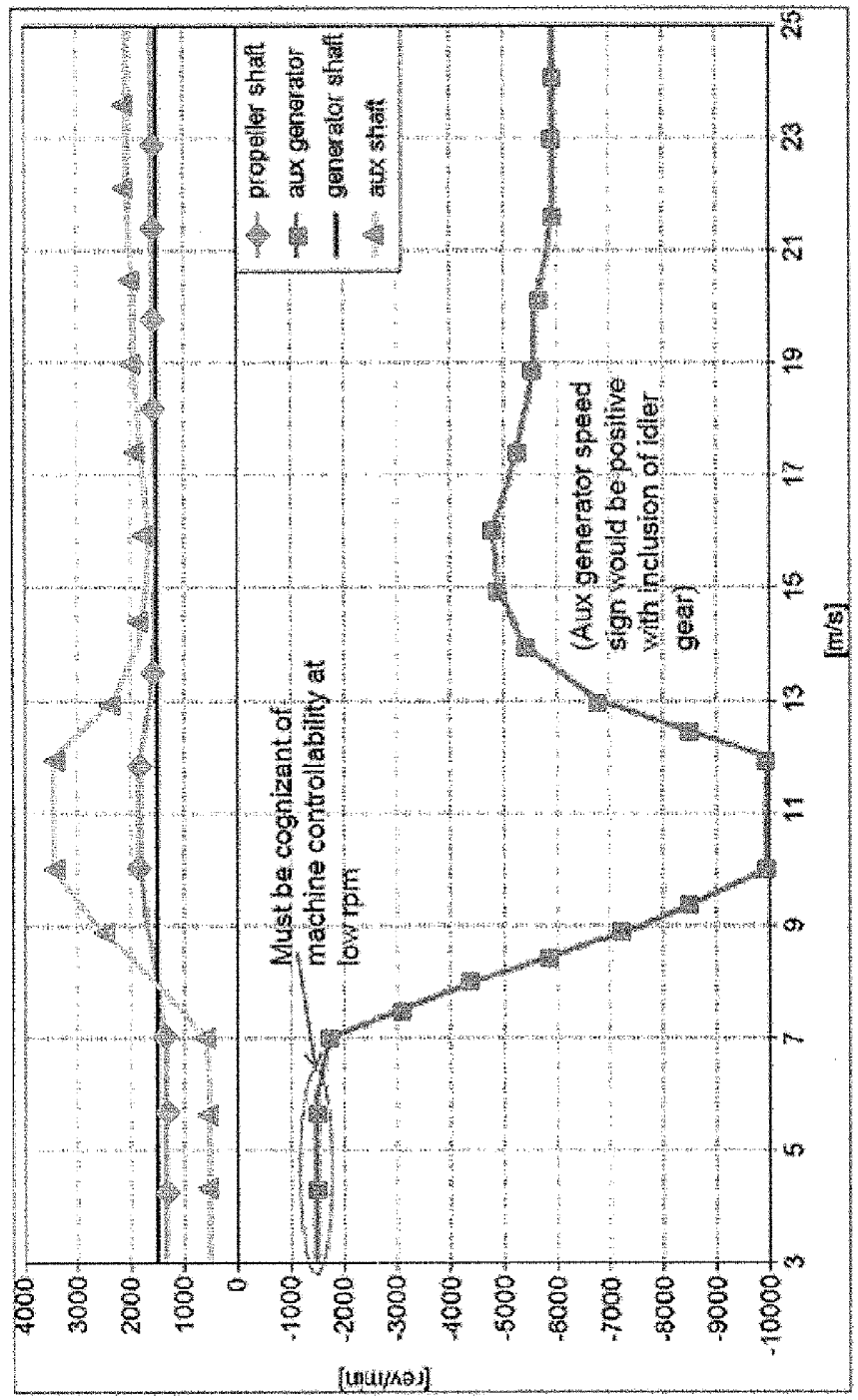

As seen in FIG. 15, the present invention may also be described as a method 300 of retrofitting a fixed speed fixed pitch wind turbine that has a main generator operating at a constant frequency, the main generator coupled without power electronics to a power grid that operates at the constant frequency. Method 300 may include a step 310 of positioning a differential 50 between the main generator 60 and a gear box, which may be a fixed ratio gear. If the wind turbine is gearless, the differential may instead be positioned between generator 60 and a rotor shaft of the gearless turbine. Differential may have a differential output shaft and a differential control shaft, the differential control shaft configured to change a ratio between an input to the differential and an output from the differential. As shown in FIGS. 10A-10B, an improved power curve may result. As described with respect to the other preferred embodiments, differential 50 may be a speed increasing gear or may be a speed decreasing gear within an overall speed increasing collection of gears.

Method 300 may also include a step 320 of positioning an auxiliary generator on the differential control shaft, the auxiliary generator coupled to an auxiliary power converter that is coupled to the electric power grid. A further step 330 of method 300 may comprise configuring a controller to assign the load of the wind turbine to one or both generators depending on the type of load. For example, during low loads controller 80 may be configured to assign a full load to the auxiliary generator. As shown in FIG. 7, this may improve aerodynamic efficiency. Controller 80 may also be configured during typical loads to assign a variable shared load between the auxiliary and main generators, a proportion of the variable shared load assigned to a particular generator determined by an algorithm, such as an efficiency optimization algorithm, which may be a heuristic algorithm, that may be dependent on at least one of wind speed and rotor speed. During high loads, controller 80 may be configured to assign a shared load, which may be fixed, between the auxiliary and main generators based on the internal gear ratio of the differential 50.

In some preferred embodiments, method 300 may include a further step of replacing the main generator with a synchronous generator (or with a PMG or a hybrid PMG).

Figure 8:
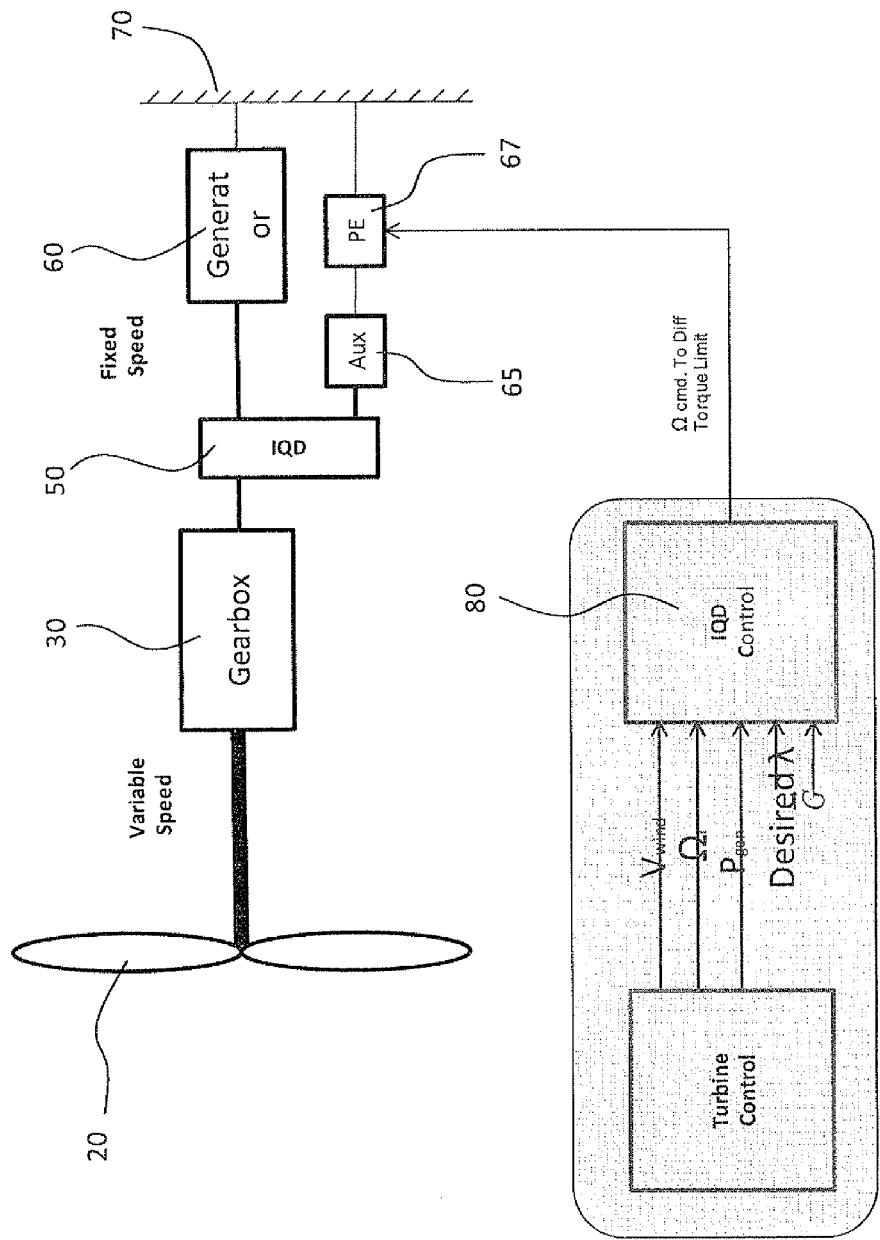
FIG. 8 is a schematic of a retrofitted fixed speed wind turbine in accordance with one embodiment of the present invention.

As shown by FIG. 8, for fixed speed turbines, retrofitting converts the turbine into a variable speed turbine. Most of the energy gain comes from speeding up the rotor since the generator rotates much faster than the rotor. For example, on the NegMicon 750 kW, the rotor rotates constantly at 22.3 RPM and the differential may allow it speed variability in the range of 20-27 RPM. Although this speeding up creates a risk of over-rating and rotor runaway, the lack of power electronics allows over-rating without risk. Over-rating is when the turbine deals with loads which are higher than what it was designed and built to handle, leading to damage. The main risk is when the wind increases suddenly, suddenly increasing the input torque (torque spike). In new turbines (DF, FC), pitch control is used to slow down rotor and reduce the input torque but this option is not available for fixed speed turbines since fixed speed wind turbine are also fixed pitch. When turning the fixed speed turbine into variable speed, the only way to reduce the income torque is by slowing down the rotor. When the fixed speed turbine is retrofitted by inserting a variable ratio differential between the fixed ratio gear box and the generator, safety requires differential 50 to be able to easily reduce rotor speed under wind gusts. This may be accomplished by the assembly 11 of the present invention. The result of a retrofit of the fixed speed turbine may be seen in FIG. 8.

Step-Down Differential

In the assembly 11 and methods of the present invention, differential 50 may be a step-down gear, i.e. a gear that acts as a speed decreasing stage. In that case, controller 80 may be configured differently during high loads. During high loads, the controller may be configured to assign the full load to the main generator and the auxiliary generator may be locked mechanically. At high loads, a torque spike from a wind gust may be held or locked mechanically by a friction brake rather than by the auxiliary generator. The highest torques on the differential control shaft 54 may be handled by the mechanical locking, not by the auxiliary generator 65. This allows the auxiliary generator to be kept relatively small, for example 200 kW for an 850 kW turbine.

Figure 11A:
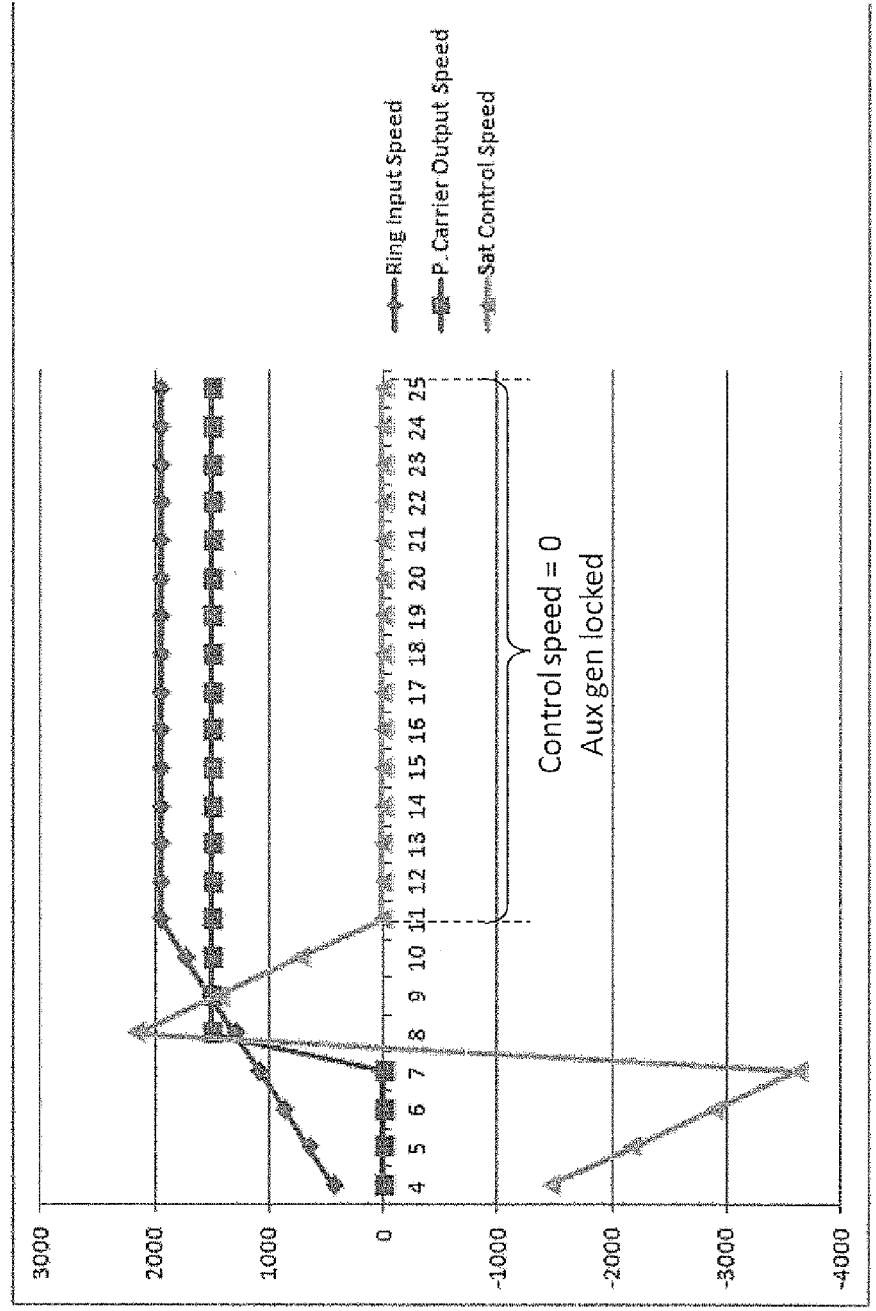
FIGS. 11A-11B is a graph showing power at different wind speeds in a doubly fed wind turbine having a step-down differential in accordance with one embodiment of the present invention.
Figure 11B:
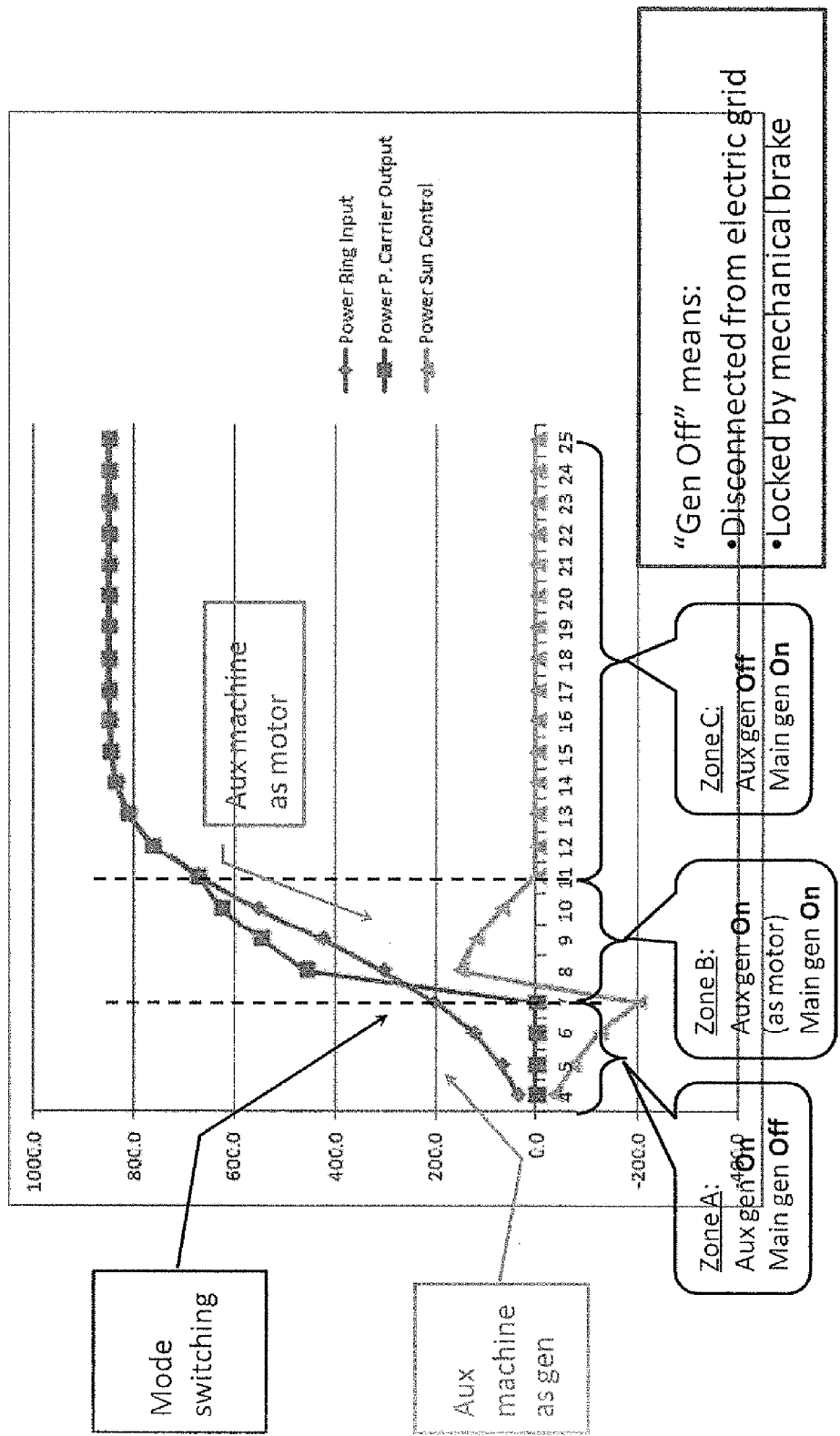

In sum, controller 80 may be configured during low loads to assign a full load to the auxiliary generator, during typical loads to assign a variable shared load between the auxiliary and main generators, a proportion of the variable shared load assigned to a particular generator determined by an efficiency optimization algorithm and dependent on at least one of wind speed and rotor speed, and during high loads to assign the full load to the main generator. As shown in FIG. 11B, at particular typical loads (a subset of the range of wind speeds of 7-12 m/s) of around 7 to 11 meters per second, the auxiliary generator 65 may act as a motor.

The differential 50 thereby slows down the rotor blades 20 and rotor shaft 22 during a torque spike from a wind gust. During high wind speed, auxiliary generator 65 may be connected to differential 50 may be mechanically locked by a friction brake. FIGS. 11A-B depict three operational zones of wind speed in a case where differential is a step-down gear stage. As can be seen from FIGS. 11A-11B, auxiliary generator 65 may function as a motor during the typical loads (Zone B) when wind speeds are between 7 and 11 meters per second. Auxiliary generator 65 may function as a generator during low loads (Zone A). During high loads, auxiliary generator 65 is shown to be halted.

This arrangement, wherein the differential 50 acts as a speed decreasing stage of an overall speed increasing collection of gear stages, may be particularly suitable for the retrofitting of the doubly fed turbine.

While the invention has been described with respect to a limited number of embodiments, it will be appreciated that many variations, modifications and other applications of the invention may be made. Therefore, the claimed invention as recited in the claims that follow is not limited to the embodiments described herein.

What is claimed is:

1. An assembly for a wind turbine, the wind turbine having a rotor shaft, rotor blades, the assembly comprising;
    a differential on one of (i) a gear set output shaft of a gear set connected to the rotor shaft and (ii) a rotor shaft of a gearless wind turbine, the differential having a differential output shaft and a differential control shaft, the differential control shaft configured to change a ratio between an input to the differential and an output from the differential and adjust rotor speed by increasing or decreasing a speed of the differential;

a main generator operating at a constant frequency and coupled to an electric power grid that operates at the constant frequency, the main generator transmitting power to the electric power grid without a power converter, the main generator coupled to the differential output shaft;

a variable speed auxiliary generator coupled to the electric grid through auxiliary power electronics, the differential control shaft coupled to the auxiliary generator;

a controller configured
   (i) during low loads to assign a full load to the auxiliary generator,
   (ii) during typical loads to assign a variable shared load between the auxiliary and main generators, a proportion of the variable shared load assigned to a particular generator determined by an efficiency optimization algorithm and dependent on at least one of wind speed and rotor speed, and
   (iii) during high loads to assign a shared load between the auxiliary and main generators based on an internal gear ratio of the differential.

2. The assembly of claim 1, wherein the controller is configured to assign the variable shared load during typical loads such that both the main and auxiliary generators are partially loaded.

3. The assembly of claim 1, wherein the controller is configured to assign the fixed shared load during high loads such that both the main and auxiliary generators are fully loaded.

4. The assembly of claim 1, wherein the controller is configured to assign a fixed shared load, during high loads, to the main and auxiliary generators.

5. The assembly of claim 1, wherein each of the main generator and the auxiliary generator is independently selected from a synchronous generator, an asynchronous generator and a pang generator.

6. A method of retrofitting a doubly fed wind turbine that is coupled to an electric power grid through power electronics, the method comprising:
   disconnecting an input/output of a main generator and removing a partial power electronics connected to the input/output while leaving a connection between the electric power grid and the main generator;
   positioning a differential between the main generator and one of (i) a fixed ratio gear box and (ii) a rotor shaft of a gearless turbine, the differential having a differential output shaft and a differential control shaft, the differential control shaft configured to change a ratio between an input to the differential and an output from the differential;
   positioning an auxiliary generator on the differential control shaft, the auxiliary generator coupled to an auxiliary power converter that is coupled to the electric power grid; and
   configuring a controller
      (i) during low loads to assign a full load to the auxiliary generator,
      (ii) during typical loads to assign a variable shared load between the auxiliary and main generators, a proportion of the variable shared load assigned to a particular generator determined by an efficiency optimization algorithm and dependent on at least one of wind speed and rotor speed, and
      (iii) during high loads to assign a fixed shared load between the auxiliary and main generators based on an internal gear ratio of the differential.

7. The method of claim 6, further comprising replacing the main generator with a synchronous generator.

8. The method of claim 6, further comprising adapting the removed power converter so as to use the removed power converter as the auxiliary power converter.

9. The method of claim 6, further comprising positioning a grid compliance device between the main generator and the electric power grid.

10. A method of retrofitting a fully converted wind turbine that is coupled to an electric power grid through power electronics, the method comprising:
   removing the power converter between a main generator and the electric power grid;
   connecting the main generator to the electric power grid;
   positioning a differential between the main generator and one of (i) a fixed ratio gear box and (ii) a rotor shaft of a gearless turbine, the differential having a differential output shaft and a differential control shaft, the differential control shaft configured to change a ratio between an input to the differential and an output from the differential;
   positioning an auxiliary generator on the differential control shaft, the auxiliary generator coupled to an auxiliary power converter that is coupled to the electric power grid; and
   configuring a controller
      (i) during low loads to assign a full load to the auxiliary generator,
      (ii) during typical loads to assign a variable shared load between the auxiliary and main generators, a proportion of the variable shared load assigned to a particular generator determined by an efficiency optimization algorithm and dependent on at least one of wind speed and rotor speed, and
      (iii) during high loads to assign a fixed shared load between the auxiliary and main generators based on an internal gear ratio of the differential.

11. The method of claim 10, further comprising replacing the main generator with a synchronous generator.

12. The method of claim 10, further comprising adapting the removed power electronics so as to use the removed power electronics as the auxiliary power converter.

13. The method of claim 10, further comprising positioning a grid compliance device between the main generator and the electric power grid.

14. A method of retrofitting a fixed speed fixed pitch wind turbine that has a main generator operating at a constant frequency, the main generator coupled without power electronics to a power grid that operates at the constant frequency, the method comprising:
   positioning a differential between the main generator and one of (i) a fixed ratio gear box and (ii) a rotor shaft of a gearless turbine, the differential having a differential output shaft and a differential control shaft, the differential control shaft configured to change a ratio between an input to the differential and an output from the differential;
   positioning an auxiliary generator on the differential control shaft, the auxiliary generator coupled to an auxiliary power converter that is coupled to the electric power grid; and
   configuring a controller
      (i) during low loads to assign a full load to the auxiliary generator,
      (ii) during typical loads to assign a variable shared load between the auxiliary and main generators, a proportion of the variable shared, load assigned to a particular generator determined by an efficiency optimization algorithm and dependent on at least one of wind speed and rotor speed, and (iii) during high loads to assign a fixed shared load between the auxiliary and main generators based on an internal gear ratio of the differential.

15. The method of claim 14, further comprising replacing the main generator with a synchronous generator.

16. An assembly for a wind turbine, the wind turbine having a rotor shaft, rotor blades, the assembly comprising;
a differential on one of (i) a gear set output shaft of a gear set connected to the rotor shaft and (ii) a rotor shaft of a gearless wind turbine, the differential having a differential output shaft and a differential control shaft, the differential control shaft configured to change a ratio between an input to the differential and an output from the differential, the differential comprising a gear that acts as a speed decreasing stage;
a main generator operating at a constant frequency and coupled to an electric power grid that operates at the constant frequency, the main generator transmitting power to the electric power grid without a power converter, the main generator coupled to the differential output shaft;
a variable speed auxiliary generator coupled to the electric grid through auxiliary power electronics, the differential control shaft coupled to the auxiliary generator;
a controller configured
(i) during low loads to assign a full load to the auxiliary generator,
(ii) during typical loads to assign a variable shared load between the auxiliary and main generators, a proportion of the variable shared load assigned to a particular generator determined by a efficiency optimization algorithm and dependent on at least one of wind speed and rotor speed, and
(iii) during high loads to assign the full load to the main generator.

17. The assembly of claim 16, wherein the auxiliary generator is mechanically locked during high loads.

18. The assembly of claim 17, wherein at high loads high torque is held mechanically by a friction brake.

19. The assembly of claim 16, wherein at particular typical loads, the auxiliary generator acts as a motor.

20. The assembly of claim 16, wherein the particular typical loads comprise wind speeds of approximately 8 to 11 meters per second.

* * * * *

UNITED STATES PATENT AND TRADEMARK OFFICE
CERTIFICATE OF CORRECTION

| | | |
|---|---|---|
| PATENT NO. | : 8,674,536 B2 | Page 1 of 1 |
| APPLICATION NO. | : 13/307014 | |
| DATED | : March 18, 2014 | |
| INVENTOR(S) | : Nimrod Eitan et al. | |

It is certified that error appears in the above-identified patent and that said Letters Patent is hereby corrected as shown below:

In the Claims

Column 13:

Claim 5, line 37 should be corrected as follows:
Change:
--erator and a pang generator.--
to
"erator and a pmg generator."

Column 14:

Claim 14, line 67 should be corrected as follows:
Change:
--tion of the variable shared, load assigned to a particu--
to
"tion of the variable shared load assigned to a particu"

Signed and Sealed this
Third Day of June, 2014

Michelle K. Lee
*Deputy Director of the United States Patent and Trademark Office*